US012323962B2

(12) United States Patent
Dijkstra et al.

(10) Patent No.: US 12,323,962 B2
(45) Date of Patent: Jun. 3, 2025

(54) METHOD AND APPARATUS FOR RADIO AREA NETWORK RESOURCE ALLOCATION IN AN ENTERPRISE WIRELESS COMMUNICATION NETWORK

(71) Applicant: Celona, Inc., Cupertino, CA (US)

(72) Inventors: Mark Jan Dijkstra, Brooklyn, NY (US); Mehmet Yavuz, Campbell, CA (US); Sushanth Chandappa Kulal, Cupertino, CA (US); Sourav Bandyopadhyay, Liluah Howrah (IN); Vinay Anneboina, San Jose, CA (US); Aparna Jaiswal, Sunnyvale, CA (US); Shashank Misra, Cupertino, CA (US)

(73) Assignee: CELONA, INC., Campbell, CA (US)

( * ) Notice: Subject to any disclaimer, the term of this patent is extended or adjusted under 35 U.S.C. 154(b) by 375 days.

(21) Appl. No.: 17/897,691

(22) Filed: Aug. 29, 2022

(65) Prior Publication Data

US 2023/0071539 A1    Mar. 9, 2023

Related U.S. Application Data

(60) Provisional application No. 63/241,386, filed on Sep. 7, 2021.

(51) Int. Cl.
*H04W 72/044* (2023.01)
(52) U.S. Cl.
CPC .............................. *H04W 72/0473* (2013.01)

(58) Field of Classification Search
CPC ................................................ H04W 72/0473
See application file for complete search history.

(56) References Cited

U.S. PATENT DOCUMENTS

| 2019/0150005 | A1* | 5/2019 | Cendrillon | ........ H04L 41/0823 |
| | | | | 370/252 |
| 2019/0373610 | A1* | 12/2019 | Cimpu | ............... H04W 72/563 |
| 2020/0015095 | A1* | 1/2020 | Cho | ..................... H04W 16/18 |
| 2020/0305159 | A1* | 9/2020 | Raghothaman | ... H04W 72/0453 |

* cited by examiner

*Primary Examiner* — Michael Thier
*Assistant Examiner* — Tracy Lauren Colbert
(74) *Attorney, Agent, or Firm* — Jaquez Land Greenhaus & McFarland, LLP; Bruce W. Greenhaus

(57) ABSTRACT

A method and apparatus for allocating radio resources in a RAN deployment in an Enterprise Network. Radio resource parameter allocation decisions for all the Base Stations and Access Points (BS/APs) in the deployment are made responsive to network graphs formed using predicted path loss. In one embodiment the predicted path loss values are simulated for a particular enterprise network deployment, network graphs are formed using the path loss values, and radio resources parameters are allocated responsive to the network graphs. Advantageously, the network graphs provide the network with the ability to quickly and efficiently allocate radio resources, which can be automated. In the initial installation, this reduces cost and time. During operation, quick and efficient resource re-allocation provides quick adaptation to resource changes, an advantage that is useful particularly in the context of a CBRS system in which previously-available channels can be terminated.

14 Claims, 35 Drawing Sheets

| Ent # | Serial Number | Channel Pair | Channel 1 | Channel 2 | Inter Freq Chs 1 | Inter Freq Chs 2 | Pci 1 | Pci 2 | Tx Power | EID | Cell ID 1 | Cell ID 2 |
|---|---|---|---|---|---|---|---|---|---|---|---|---|
| 1 | 2009CW5000191 | 1 | 56640 | 55340 | 56340 56140 55840 | 55640 55840 56340 56140 | 3 | 33 | -4 | 1189 | 304385 | 304386 |
| 2 | 2009CW5000210 | 2 | 56340 | 55640 | 56640 56140 55840 55340 | 55340 55840 56640 56140 | 9 | 39 | -4 | 1188 | 304129 | 304130 |
| 3 | 2009CW5000140 | 1 | 56640 | 55340 | 56340 56140 55840 | 55640 55840 56340 56140 | 4 | 34 | -13 | 1187 | 303873 | 303874 |
| 4 | 2009CW5000149 | 3 | 56140 | 55840 | 56640 56340 55840 55340 | 55640 55340 56640 56340 | 15 | 45 | -3 | 1186 | 303617 | 303618 |
| 5 | 2009CW5000072 | 3 | 56140 | 55840 | 56640 56340 55840 55340 | 55340 55840 56640 56340 | 16 | 46 | -3 | 1192 | 305153 | 305154 |
| 6 | 2009CW5000099 | 2 | 56340 | 55640 | 56640 56140 55840 55340 | 55340 55840 56640 56140 | 10 | 40 | -13 | 1190 | 304641 | 304642 |
| 7 | 2009CW5000188 | 4 | 56340 | 55640 | 56640 56140 55840 55340 | 55340 55840 56640 56140 | 11 | 41 | -3 | 1193 | 305409 | 305410 |
| 8 | 2009CW5000179 | 1 | 56640 | 55340 | 56340 56140 55840 | 55640 55840 56340 56140 | 5 | 35 | -3 | 1191 | 304897 | 304898 |

| System Number | Serial Number | Floor | Channel Pair | Channel 1 | Channel 2 | InterFreqChs1 | InterFreqChs2 | Pci 1 | Pci 2 |
|---|---|---|---|---|---|---|---|---|---|
| System 1 | 2009CWS000127 | 1 | 2 | 55340 | 55640 | 55840 56340 56140 55640 | 56140 56640 55840 56340 | 3 | 33 |
| System 2 | 2009CWS000207 | 1 | 1 | 55840 | 56140 | 55340 56340 55640 55640 | 55640 56340 55340 56340 | 6 | 36 |
| System 9 | 2009CWS000095 | 1 | 3 | 56340 | 56640 | 55340 55840 55840 56140 | 55640 56140 55340 55840 | 9 | 39 |
| System 3 | 2009CWS000112 | 2 | 2 | 55340 | 55640 | 55840 56340 56140 55640 | 56140 56640 55840 56340 | 4 | 34 |
| System 4 | 2009CWS000052 | 2 | 1 | 55840 | 56140 | 55340 56340 55640 55640 | 55640 56640 55340 56340 | 7 | 37 |
| System 5 | 2009CWS000134 | 2 | 3 | 56340 | 56640 | 55340 55840 55840 56140 | 55640 56140 55340 55840 | 10 | 40 |
| System 6 | 2009CWS000091 | 3 | 3 | 56340 | 56640 | 55340 55840 56140 55340 | 55640 56140 55340 55840 | 11 | 41 |
| System 7 | 2009CWS000104 | 3 | 1 | 55840 | 56140 | 55340 56340 55640 55640 | 55640 56340 55340 55840 | 8 | 38 |
| System 8 | 2009CWS000199 | 4 | 2 | 55340 | 55640 | 56340 55840 55340 56140 | 56640 56340 56140 56340 | 12 | 42 |
| System 10 | 2009CWS000079 | 4 | 3 | 56340 | 56140 | 55340 55840 56340 56140 | 55840 56140 56140 55840 | 15 | 45 |
| System 11 | 2009CWS000215 | 5 | 1 | 55840 | 56140 | 55340 56340 56340 55640 | 55640 55840 56340 56340 | 18 | 48 |
| System 12 | 2009CWS000054 | 5 | 2 | 55340 | 55640 | 55840 56140 56340 56640 | 56140 55840 56340 56340 | 13 | 43 |
| Alpha | 12020003402208HY0039 | Outdoor | 2 | 55340 | 55640 | 55840 56340 56140 55640 | 56140 56640 55840 56340 | 14 | 44 |
| Beta | 12020003652118Y0090 | Outdoor | 3 | 56340 | 56640 | 55340 55840 55640 56140 | 55640 56140 55340 55840 | 16 | 46 |
| Delta | 12020803402208HY0065 | Outdoor | 3 | 56340 | 56140 | 55340 55840 55640 56140 | 55540 56140 55340 55840 | 17 | 47 |
| Gamma | 12020803402208HY0068 | Outdoor | 1 | 55840 | 56140 | 55340 56640 55340 55640 | 56340 56640 55340 55640 | 19 | 49 |

FIG. 30

METHOD AND APPARATUS FOR RADIO AREA NETWORK RESOURCE ALLOCATION IN AN ENTERPRISE WIRELESS COMMUNICATION NETWORK

CLAIM OF PRIORITY TO PREVIOUSLY FILED PROVISIONAL APPLICATION-INCORPORATION BY REFERENCE

This utility application claims priority under 35 USC section 111 (b) and under 35 USC section 119 (e), to earlier-filed provisional application No. 63/241,386 filed Sep. 7, 2021, entitled "Method and Apparatus for Radio Area Network Resource Allocation in an Enterprise Wireless Communication Network"; and the contents of the above-cited earlier-filed provisional application (App. No.: 63/241,386) are hereby incorporated by reference herein as if set forth in full.

BACKGROUND

Technical Field

The disclosed method and apparatus relate generally to deployment and management of base stations in enterprise wireless networks, and particularly to allocation of wireless resources between the base stations of a Radio Access Network (RAN).

Background

The wireless industry has experienced tremendous growth in recent years, with rapidly improving technology, faster and more numerous broadband communication networks are being installed around the globe. Wireless networks have now become key components of a world-wide communication system that connects people and businesses at speeds and on a scale unimaginable just a couple of decades ago. In wireless systems, multiple mobile devices are served voice services, data services, and many other services over wireless connections so they may remain mobile while still connected.

Communication Network Configurations

FIG. 1 is an illustration of a basic configuration for a communication network 100, such as a "4G LTE" (fourth generation Long-Term Evolution) or "5G NR" (fifth generation New Radio) network. Through this network configuration, user equipment (UE) 101 can connect to External Packet Data Networks (PDNs) 103 and access any of a variety of services such as the Internet, Application Servers, Data Services, Voice Services, and others.

UEs, BS/APs, RAN

"UEs", or "devices", or "UE devices" can be used to refer to a wide range of user devices having wireless connectivity, such as a cellular mobile phone, an Internet of Things (IOT) device, virtual reality goggles, robotic devices, autonomous driving machines, smart barcode scanners, and communications equipment including desktop computers, laptop computers, tablets, and other types of personal communications devices. In the illustration of FIG. 1, the UEs 101 include a first mobile phone 101a, a second mobile phone 101b, a laptop computer 101c (which can be moved around), and a printer 101d (typically situated at a fixed location).

The UEs 101 connect wirelessly over radio communication links 105 to a Radio Access Network (RAN) 107 that typically includes multiple base station/access points (BS/APs) 109. One of the advantages of such wireless networks is their ability to provide communications to and from multiple wireless devices and provide these wireless devices with access to a large number of other devices and services even though the devices may be mobile and moving from location to location.

The term 'BS/AP" is used herein to include Base Stations and Access Points. The BS/APs may include an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, and a Wide Area Network (WAN) access point.

Core Network

The RAN 107 connects the UEs 101 with the Core Network 111, which provides an interface between the RAN 107 and other networks. The Core Network can have multiple functions; in one important function, the Core Network 111 provides access to other devices and services either within its network, or on other networks such as the External PDNs 103. Particularly, the UEs 101 are wirelessly connected to the BS/APs 109 in RAN 107, and the RAN 107 is coupled to the Core Network 111 utilizing any appropriate communication means, such as wireless, cable, and fiber optic. Thus, the RAN 107 and the Core Network 111 provide a system that allows information to flow between a UE in the cellular or private network and other networks, such as the Public Switched Telephone Network (PSTN) or the Internet.

In addition to providing access to remote networks and allowing information to flow between the cellular network and the external PDNs 103, the Core Network 111 includes RAN Control Units 113 that manage the wireless network and provide control of the air interface between the BS/AP 119 and the UEs 101. The Core Network 111 may also coordinate the BS/APs 109 to minimize interference within the network.

CBRS Networks

One type of wireless network that recently became available for general use by enterprise locations is a Citizen's Broadband Radio Service (CBRS) network, which utilizes the CBRS radio band of 3550-3700 MHZ, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. CBRS supports both LTE and 5G devices. CBRS provides enormous wireless networking power to organizations that have never had such an option before and opens up and creates opportunities for a range of new applications.

FIG. 2 is a diagram of an example of a CBRS wireless communication network 200. In FIG. 2, a plurality of BS/APs 202 are deployed within a location 203 on the enterprise's campus, providing service to a plurality of UEs 204. In a CBRS system, the BS/APs may be termed CBSDs.

In FIG. 2, each BS/AP 202 has a range that represents its respective wireless coverage. A first UE 202a is wirelessly connected to a first BS/AP 204a, which is providing service to it. A second UE 204b is wirelessly connected to a second BS/AP 202b and is providing service to that second UE 204b. Other UEs 204 connect to their respective BS/APs, for example third UE 204c, fourth UE 204d, fifth UE 204e, sixth UE 204f, and seventh UE 204g are shown in the enterprise location 203. All the BS/APs are connected to an operator Core Network 222 by any appropriate communication means, such as wire, fiber optic, wireless radio and/or a PDN 220. The operator Core Network 222 includes components such as an OAM Server 207, a SON assist unit 208, a Domain Proxy 209, an Automatic Configuration Server (ACS) 210, a Location Database 211, and other databases 212, all of which are connected to each other within the operator Core Network 222 by any appropriate means.

Base stations (BS/APs) within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR).

SAS

The operator Core Network 222 is connected to a Spectrum Access System (SAS) 232, which is connected to a Spectrum Database 233 that includes data regarding the spectrum that it is managing. Collectively, the SAS 232 and the Spectrum Database 233 are referred to as a Spectrum Management Entity (SME) 234. The SAS 232 provides a service, typically cloud-based, that manages the spectrum used in wireless communications of devices transmitting in the CBRS band in order to prevent harmful interference to higher priority users, such as the military and priority licensees. The CBRS rules require that the SAS 232 allocate spectrum to the CBSDs to avoid interference within the CBRS band. To allocate spectrum and maintain communication between the CBSDs and the SAS 232, a series of messages are exchanged for purposes including registration, spectrum inquiry, grant, and heartbeat response. In a RAN that has multiple CBSDs, the Domain Proxy (DP) 209 may be implemented to communicate with the SAS and manage all transactions between the CBSDs and the SAS 232. The Spectrum Sharing Committee Work Group 3 (for CBRS Protocols) has established an interface specification for registering a CBSD with an SAS 232, requesting a grant of spectrum, and maintaining that grant. These message flows are described in the document titled "Signaling Protocols and Procedures for Citizens Broadband Radio Service (CBRS): Spectrum Access System (SAS)-Citizens Broadband Radio Service Device (CBSD) Interface Technical Specification", Document WINNF-TS-0016-V1.2.4, 26 Jun. 2019.

Regardless of complexities, the CBRS band provides an opportunity to create new wireless networks, and there is a desire for utilizing and making maximum use of spectrum in the CBRS band while following the rules pertaining to the CBRS usage, including effectively responding to directions from the SAS.

Resource Allocation

In any enterprise wireless network there is a need for efficient use of wireless resources, for cost reasons of course, but also to provide high levels of service to the UEs attached to the wireless network. In other words, radio resource planning is crucial to provide the QoS promised by a mobile network provider. However, conventional radio resource allocation is a time intensive process and often requires domain expertise and even with that, significant amounts of manual intervention.

Therefore, a tool that can facilitate the process of bringing up a network that requires minimal human resources and minimal manual intervention would be attractive from both a cost basis perspective and an automation perspective.

A self-organizing network (SON) is an automation technology designed to make the planning, configuration, management, optimization, and healing of mobile RANs simpler and faster. SON functionality and behavior has been defined and specified in generally accepted mobile industry recommendations produced by organizations such as 3GPP (3rd Generation Partnership Project) and the NGMN (Next Generation Mobile Networks). However, there are limitations to such functionality, and more generally, managing enterprise networks to more efficiently allocate the available network resources is an important objective. It is advantageous to provide an efficient way to allocate channels in the spectrum among the BS/APs deployed in the RAN of the wireless network location to provide a high level of uninterrupted service to connected UEs and also minimize interference. This problem more broadly applies to any wireless communication system that utilizes a spectrum managed by a remote entity (an SME); and particularly, due to the potentially serious disruption to communications when channels are terminated, it is desirable to re-allocate the channels in such a way that the network can be very quickly reconfigured with a minimum of disruption to the network.

SUMMARY

Radio resource planning is crucial to provide the Quality of Service (QOS) promised by a mobile network provider. Radio resource planning in a Radio Area Network (RAN) generally requires domain expertise, and even with that expertise, significant amounts of manual intervention may be required. Therefore, a tool that can facilitate the process of allocating wireless resources that requires minimal human resources and minimal manual intervention is attractive from both a cost basis perspective and an automation perspective.

In order to more quickly and efficiently allocate radio resources, a method is disclosed that uses minimum information: predicted path loss values for a given Enterprise Network location. Particularly, a resource allocation method disclosed here uses estimated and/or simulated data for a given Enterprise Network (EN) deployment, including path loss data for all BS/APs in the deployment, to make radio resource parameter allocation decisions contingent on the conjunction of the simulated path loss data across all BS/APs and the resources deemed usable at a given point in time by an SAS provider. In one embodiment the predicted path loss values are simulated for a particular enterprise network deployment, and the radio resources parameters are allocated contingent upon the conjunction of the simulated path loss across all the BS/APs and the resources deemed usable at a given point in time by an SAS provider.

Advantageously, the resource allocation method allows for quick adaptation to resource changes; particularly, at any time during network operation, the available resources may change; i.e., one or more resources that were previously available, become no longer available. Resource changes can be significant, especially in the CBRS environment. For example, the spectral resources (channels) available for use in RAN parameter allocation in a shared spectrum environment facilitated by an SAS arbitrator are prone to very significant changes in channel availability, which calls for a need to be able to quickly reallocate the channels and reconfigure the network in response a more constricted resource pool or perhaps to upgrade to a larger resource pool in order to optimize a network's QoS. The ability to quickly adapt to resource changes provides a way to deploy and operate the network continuously and adjust the resource assignments without the need for manual intervention In one embodiment a resource allocation system for allocating wireless resources to each of the BS/APs of a Radio Access Network (RAN) situated in a campus location of a wireless Enterprise Network (EN), includes a path loss estimation unit for providing path loss data associated with the BS/APs in the campus location, a network graph construction unit for constructing a network graph of the RAN responsive to the path loss data, a domain proxy for determining available channels and a maximum power available for each of the available channels, and a SON unit. The SON unit includes a channel assignment unit for assigning the channels to the BS/APs responsive to the network graph, a Physical Cell Identifier (PCI) allocation unit for determining PCI allocation for each assigned channel responsive to the network graph, and a power assignment unit for assigning power to each of the BS/APs responsive to the network graph in an iterative process that incrementally reduces the power and observes the effect on the resulting throughput CDF (Cumulative Distribution Function). The Enterprise network may comprise a Citizen's Broadband Radio Service (CBRS) system.

A method of allocating RAN resources in a wireless Enterprise Network is described that includes receiving path loss data for each of the BS/APs in the RAN, constructing a network graph responsive to the path loss data, determining available channels and a maximum power available for each of the available channels, assigning the channels to the BS/APs responsive to the network graph, determining PCI allocation for each assigned channel responsive to the network graph, and assigning power to each of the BS/APs responsive to the network graph, in an iterative process that incrementally reduces the power and observes the effect on the resulting throughput CDF.

In another embodiment, a method of planning a Radio Access Network (RAN) for an enterprise network and deploying the plurality of BS/APs in the RAN with limited radio resources includes determining path losses between the BS/APs in the enterprise network, determining RAN parameters for each BS/AP responsive to the path loss between the BS/APs in the RAN, including assigning channels, allocating Physical Cell Identifiers (PCIs), and determining power assignments, and operating the RAN utilizing the determined RAN parameters.

A method is described for reallocating RAN resources using a network graph showing path loss in a wireless Enterprise Network, including determining available channels and a maximum power available for each of the available channels, reallocating the RAN resources responsive to the network graph, including assigning the channels to the BS/APs responsive to the network graph, determining PCI allocation for each assigned channel responsive to the network graph, and assigning power to each of the BS/APs responsive to the network graph, in an iterative process that incrementally reduces the power and observes the effect on the resulting throughput CDF. Reallocating the RAN resources may be performed responsive substantially solely to the network graph and the available resources available, so that the RAN resources are reallocated quickly.

In some embodiments the enterprise wireless network operates on the Citizen's Broadband Radio Service (CBRS band), the BS/APs in the RAN comprise CBRS Devices (CBSDs) that are located at a campus location and form part of an enterprise network. In alternative implementations, other network architectures and other technologies, such as mm-wave, or spectrum purchased/licensed from others, could be utilized.

BRIEF DESCRIPTION OF THE DRAWING

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 10A is a diagram of a previously-determined network graph, showing overlapping BS/APs with line connections.

FIG. 10S is a diagram of showing a channel pair assigned to the last BS/AP.

FIG. 13A is an example of a network graph with channel assignments.

FIG. 13B is a diagram of the network graph showing the BS/AP, highlighted in yellow, that has the highest incident edge weight, which is selected first for PCI assignment.

FIG. 13C is a diagram of the network graph showing the PCI assignment to the BS/AP, now highlighted in green, and selection of the next BS/AP, highlighted in yellow, for PCI assignment.

FIG. 13D is a diagram of the network graph showing the PCI assignment to the previously-selected BS/AP, now highlighted in green, and selection of the next BS/AP for PCI assignment, highlighted in yellow.

FIG. 13E is a diagram of the network graph showing the PCI assignment to the previously-selected BS/AP, now highlighted in green, and selection of the next BS/AP for PCI assignment, highlighted in yellow.

FIG. 13F is a diagram of the network graph showing the PCI assignment to the previously-selected BS/AP, now highlighted in green, and selection of the next BS/AP for PCI assignment, highlighted in yellow.

FIG. 13G is a diagram of the network graph showing the PCI assignment to the previously-selected BS/AP, now highlighted in green, and selection of the next BS/AP for PCI assignment, highlighted in yellow.

FIG. 13H is a diagram of the network graph showing the PCI assignment to the previously-selected BS/AP, now highlighted in green, and selection of the next BS/AP for PCI assignment, highlighted in yellow.

FIG. 13I is a diagram of the network graph showing the PCI assignment to the previously-selected BS/AP, now highlighted in green, and selection of the next BS/AP for PCI assignment, highlighted in yellow.

FIG. 13J is a diagram of the network graph showing the PCI assignment to the previously-selected BS/AP, now highlighted in green, and selection of the next BS/AP for PCI assignment, highlighted in yellow.

FIG. 13K is a diagram of the network graph showing the PCI assignment to the previously-selected BS/AP, now highlighted in green, and selection of the next BS/AP for PCI assignment, highlighted in yellow.

FIG. 13L is a diagram of the network graph showing the final PCI assignments.

FIG. 28 is a table that shows an example of a chart of the RAN parameters shown in FIG. 27, showing assigned channels, PCIs, and power assignments for eight BS/APs.

FIG. 30 is table of RAN parameters in an example in which some BS/APs are located within a building, and some outside.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

(1) Enterprise Network

An implementation of an enterprise wireless communication network (EN) at a campus location is described herein. The term "enterprise" is used herein in its broadest sense to include any organization, such as businesses, research organizations, schools, colleges, hospitals, industry organizations, and any other organization, regardless of whether or not for profit. The term "campus" is used in its broadest sense to include any area in which the enterprise operates, such as the grounds and/or buildings operated or managed by the enterprise, college campuses, research centers, industrial complexes, any business or industrial site, and others.

An enterprise wireless communication network (EN) is a private network. Private networks are operated for use within a limited area by a limited group of authorized users, whereas public networks generally cover a larger area and are open for use by anyone that subscribes to the service by the network operator. One or more ENs can be created at a location such as a warehouse, factory, research center or other building, and are usually operated by an organization for its own use. Other types of private networks may be operated by a private network manager for use by more than one organization. Although described in the context of an enterprise wireless communication network, the principles disclosed can also apply to any private wireless network.

Figure 1:
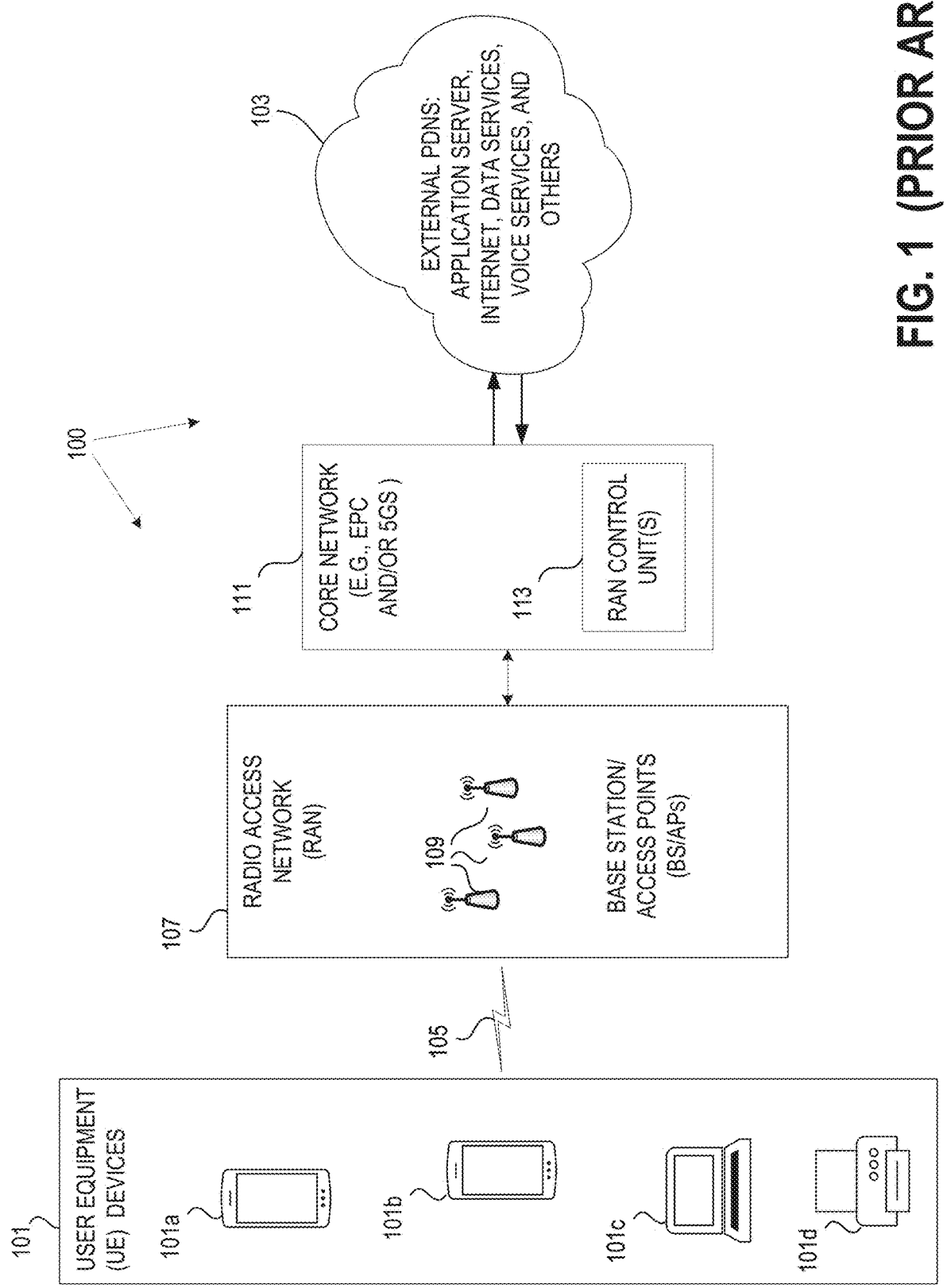
FIG. 1 is an illustration of a basic configuration for a communication network, such as a "4G LTE" (fourth generation Long-Term Evolution) or "5G NR" (fifth generation New Radio) network.

An EN may comprise any appropriate wireless network technology that can connect to UEs. For example, the LTE (4G) network shown in FIG. 1 and/or the NR (5G) Network shown in FIG. 2 can be implemented in an EN. In addition, the EN may also be implemented as a CBRS network using, for example, the LTE (4G) or NR (5G) technologies.

(2) Communication Networks

Communication networks and system components may be described herein using terminology and components relating to 4G, 5G, and CBRS systems and their approved (registered) interfaces including 4G (LTE) (IEEE 802.16e), 5G NR 3GPP TS 38.300, E_UTRA (3GPP TS 36.300) communication systems. For instance, the term "CBSD" is one implementation of a Base Station/Access Point (BS/AP) and is used herein for descriptive purposes in the context of a CBRS system. The principles of the communication network described herein more widely apply to other communication networks and systems, and particularly to any spectrum-controlled communication system and network. In some embodiments, the enterprise wireless communication network operates on the CBRS band, and the BS/APs comprise CBRS devices (CBSDs) that are located at a campus location.

(3) Acronyms

Some of the Acronyms Used Herein are as Follows:
ACS: Automatic Configuration Server
BFS: Breadth First Search
BS/AP: Base Station/Access Point
CBRS: Citizen's Broadband Radio Service
CBSD: CBRS devices
CDF: Cumulative Distribution Function:
PCI: Physical Cell Identifier
PDN: Packet Data Network
PSS: Primary Synchronization Signal
RAN: Radio Access Network
RF: Radio Frequency
RRC: Radio Resource Control
SAS: Spectrum Access System
SINR: Signal to Interference-plus-Noise Ratio
SSS: Secondary Synchronization Signal
UE: User Equipment

(4) UEs, BS/APs, RAN, Core Network

As used herein, the term "UE", or "devices", or "UE devices" refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets, and other types of personal communications devices. In some cases, the UEs may be mobile; in other cases, they may be installed or placed at a fixed position within a campus location. In other examples, the UEs may include factory sensors installed at fixed locations from which they can remotely monitor equipment such as an assembly line or a robotic arm's movement. Examples of services that can be provided to UEs by a wireless network include:
  voice calls;
  web browsing;
  downloads of document or other information;
  video (e.g., YouTube);
  social media (e.g., Facebook, Twitter); and
  video security cameras, sensors, and many others.

The UEs connect wirelessly over radio communication links to a Radio Access Network (RAN) that typically includes multiple base station/access points (BS/APs) that include antennas, amplifiers, and other electrical and control units for communicating with the UEs. Typically, the radio communication links operate using a Radio Resource Control (RRC) protocol, which is managed by circuitry in the BS/APs.

The term 'BS/AP" is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs and circuitry that provide access to a network of a plurality of wireless transceivers within range of the BS/AP. Typically, the BS/APs are used as transceiver hubs, whereas the UEs are used for point-to-point communication and are not used as hubs. Therefore, the BS/APs transmit at a relatively higher power than the UEs.

A Core Network provides a number of functions and services, including an interface between the RAN and other networks. In one important function, the Core Network provides the UEs in the RAN with access to other devices and services either within its network, or on other networks such as the External PDNs. Particularly, in cellular networks and in private networks, the UEs wirelessly connect with BS/APs in the RAN, and the RAN is coupled to the Core Network. Therefore, the RAN and the Core Network provide a system that allows information to flow between a UE in the cellular or private network and other networks.

In addition to providing access to remote networks and allowing information to flow between the cellular network and the external PDNs, the Core Network may include RAN Control Units that manage the wireless network and provide control of the air interface between the BS/AP and the UEs. The Core Network may also coordinate the BS/APs to minimize interference within the network.

(5) CBRS Networks

A Citizen's Broadband Radio Service (CBRS) network utilizes the CBRS radio band of 3550-3700 MHZ, nominally divided into fifteen channels of 10 MHz each. Particularly, the US Federal Government recently approved use of the CBRS band of the frequency spectrum and finalized rules (Rule 96) that allow general access to the CBRS band. The CBRS rules set forth detailed requirements for the devices that operate in a CBRS network and how they communicate. Both LTE networks and 5G networks can be implemented in CBRS systems. Base stations (BS/APs) within a CBRS network are termed "CBSDs", and UEs are termed End User Devices (EUDs). All the CBSDs are connected to an operator Core Network by any appropriate communication means, such as wire, fiber optic, wireless radio and/or a PDN, which includes components such as an OAM Server, a SON assist unit, a Domain Proxy, an Automatic Configuration Server (ACS), a Location Database, and other databases, all of which are connected to each other within the operator Core Network by any appropriate means. The operator Core Network is connected to an SAS, which is connected to a Spectrum Database that includes data regarding the spectrum that it is managing; collectively, the SAS and the Spectrum Database are referred to as a Spectrum Management Entity (SME).

(6) RF Environment, Campus Location

The design of a RAN deployment, and the allocation of resources in a deployed RAN, is greatly dependent upon the RF environment at the campus location where the RAN is deployed. At any RAN deployment, the RF environment can vary due to a variety of causes; for example, physical obstacles like buildings affect the RF environment, also the relative positioning of the transmitters and UEs, interference, campus layout, features, and building construction: walls, materials, carpeted/non-carpeted all can affect the RF environment and may vary widely between locations. In other words, the RF environment can vary greatly within a RAN, and accordingly each BS/AP may see a different path loss.

Following are examples of a campus location and a building in which a RAN is deployed, all of which contribute to the RF environment. Particularly, FIG. 3 is a perspective illustration of a campus location 300 that has wireless coverage and FIG. 4 is a cross-sectional view of a building 400 on the campus location 300.

Figure 3:
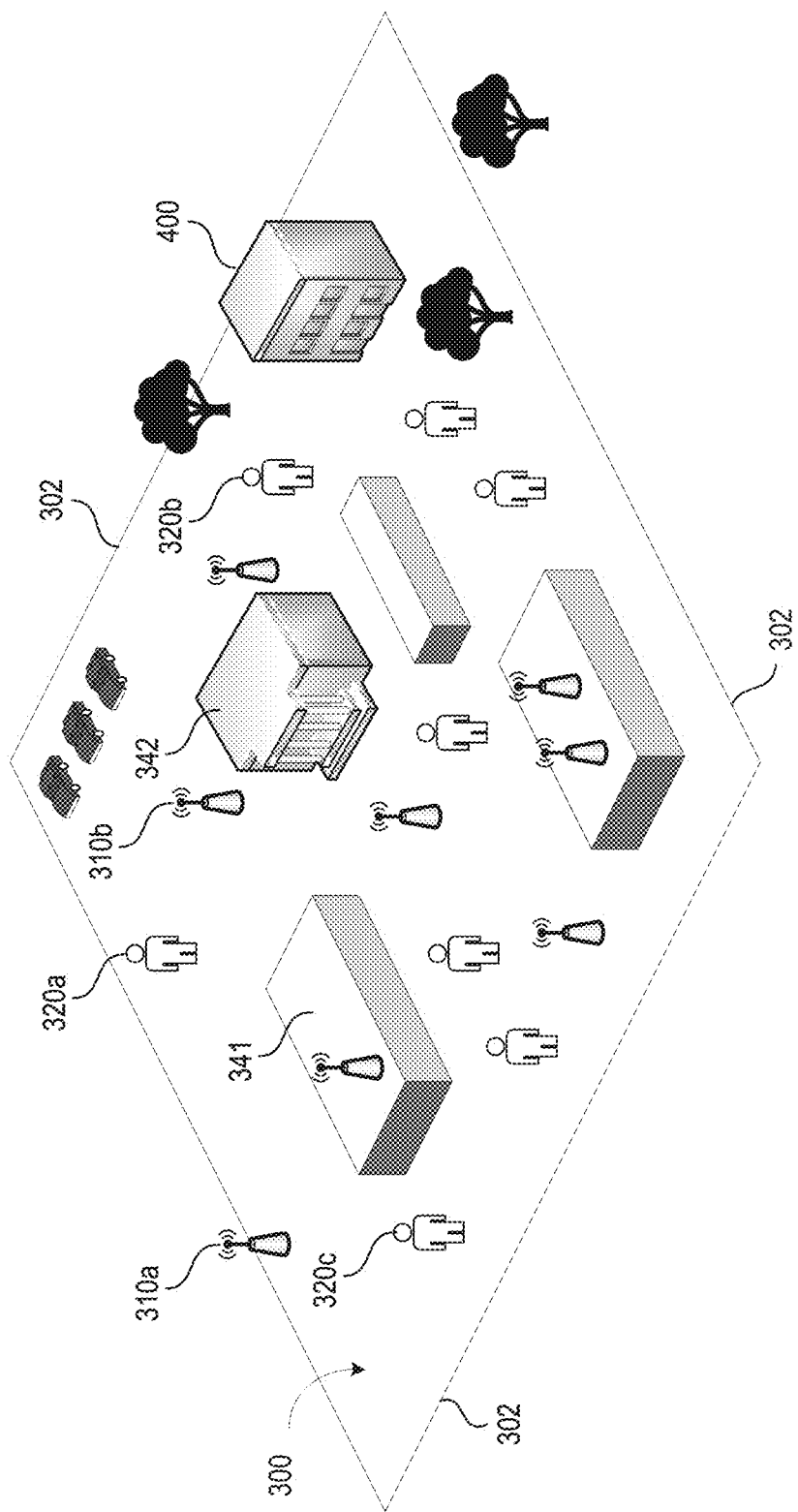
FIG. 3 is a perspective illustration of a campus location in which a plurality of BS/APs of an Enterprise Network (EN) are installed to provide wireless coverage to a plurality of mobile users.

FIG. 3 is a perspective illustration of a campus location 300 in which a plurality of BS/APs including at least a first BS/AP 310a, a second BS/AP 310b (collectively 310) of an Enterprise Network (EN) are installed to provide wireless coverage to a plurality of mobile users such as a first user 320a a second user 320b, and a third user 320c (referred to collectively as 320). Each mobile user 320 may be carrying one or more UEs such as a mobile phone, laptop computer, or some other device that can be connected to the EN.

The campus location 300 defines a boundary perimeter 302, and the BS/APs 310 are deployed within the boundary 302. The positions and configuration of the BS/APs 310 deployed within the campus location 300 are selected to provide wireless coverage to the plurality of users 320 for the EN. The BS/APs 310 may be installed indoors and outdoors, and may comprise any type of BS/AP. The BS/APs 310 generally provide wireless coverage substantially throughout the campus location 300, indoor and outdoor, with coverage usually extending to surrounding areas at least to some extent. In one embodiment the BS/APs 310 comprise CBSDs and the EN includes a CBRS network. In some embodiments some of the BS/APs 310, particularly the BS/APs installed indoors, have a UE built into them. These built-in UEs can be used for making measurements that can be used to determine the MN footprint information, as described herein.

Figure 4:
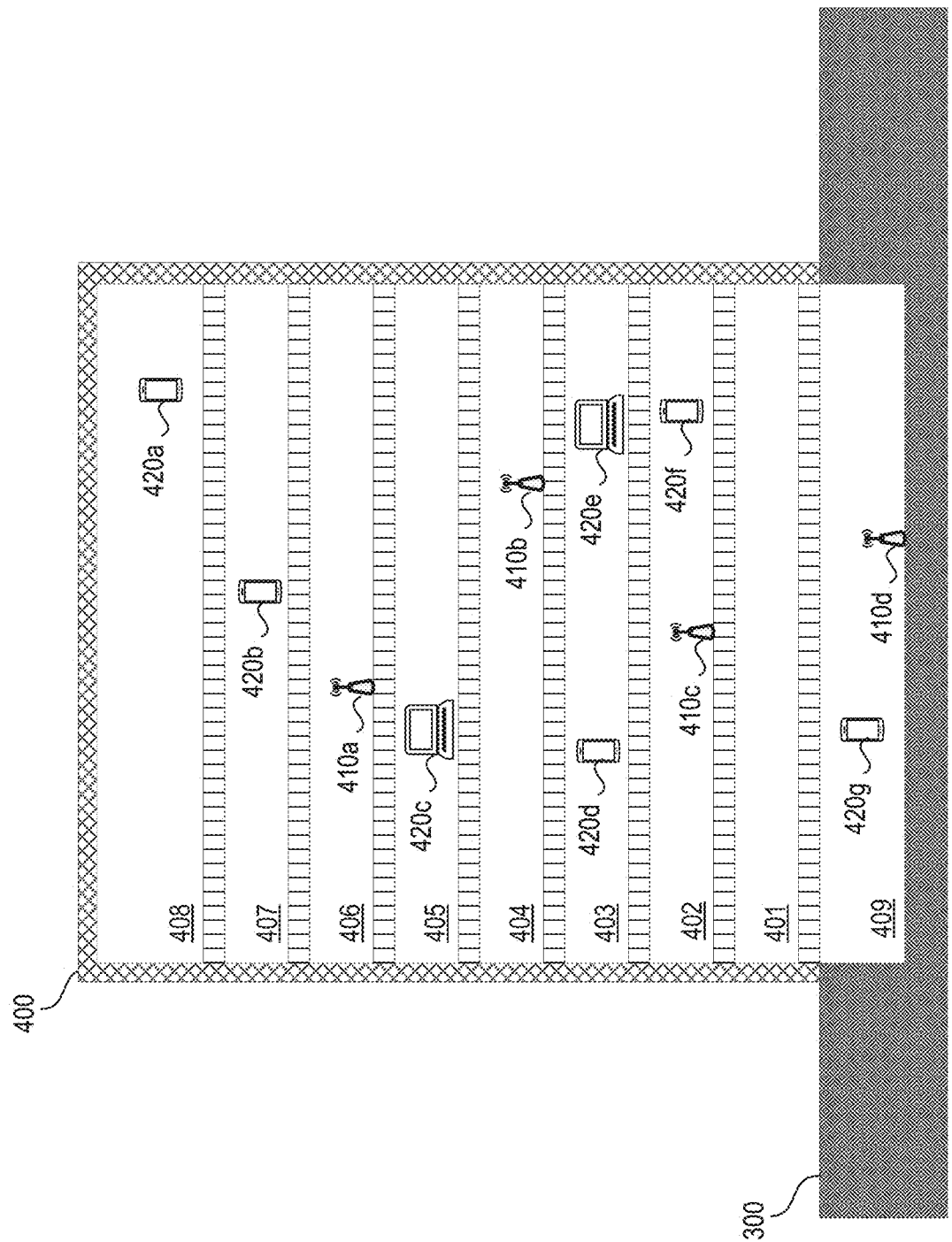
FIG. 4 is a cross-sectional view of a building on the campus location in which BS/APs are installed on different floors.

FIG. 4 is a cross-sectional view of a building 400 on the campus location 300 in which a plurality of BS/APs of the RAN are installed on different floors. In this example, a first BS/AP 410a is installed on the sixth floor 406, a second BS/AP 410b is installed on the fourth floor 404, a third BS/AP 410c is installed on the first floor 401, and a fourth BS/AP 410d is installed in the basement 409. Building construction (walls, materials, carpeted/non-carpeted) can vary widely between locations, and all can affect the RF environment. In some embodiments, the indoor BS/APs 410 have a UE built into them, which can be used for making measurements.

(7) Overview

Radio resource allocation is critical for the effectiveness of a cellular wireless network; however conventional resource allocation techniques are very time intensive due partly to the large amount of information needed to allocate resources adequately. Such methods may also require extensive manual work. In order to simplify resource allocation and reduce the time necessary to allocate resources in a radio network, a resource allocation method is disclosed using a small amount of information, particularly using predicted path-loss values for a given area. Furthermore, the process can be at least partially automated, reducing or even eliminating much of the manual work that would otherwise be required.

Figure 5:
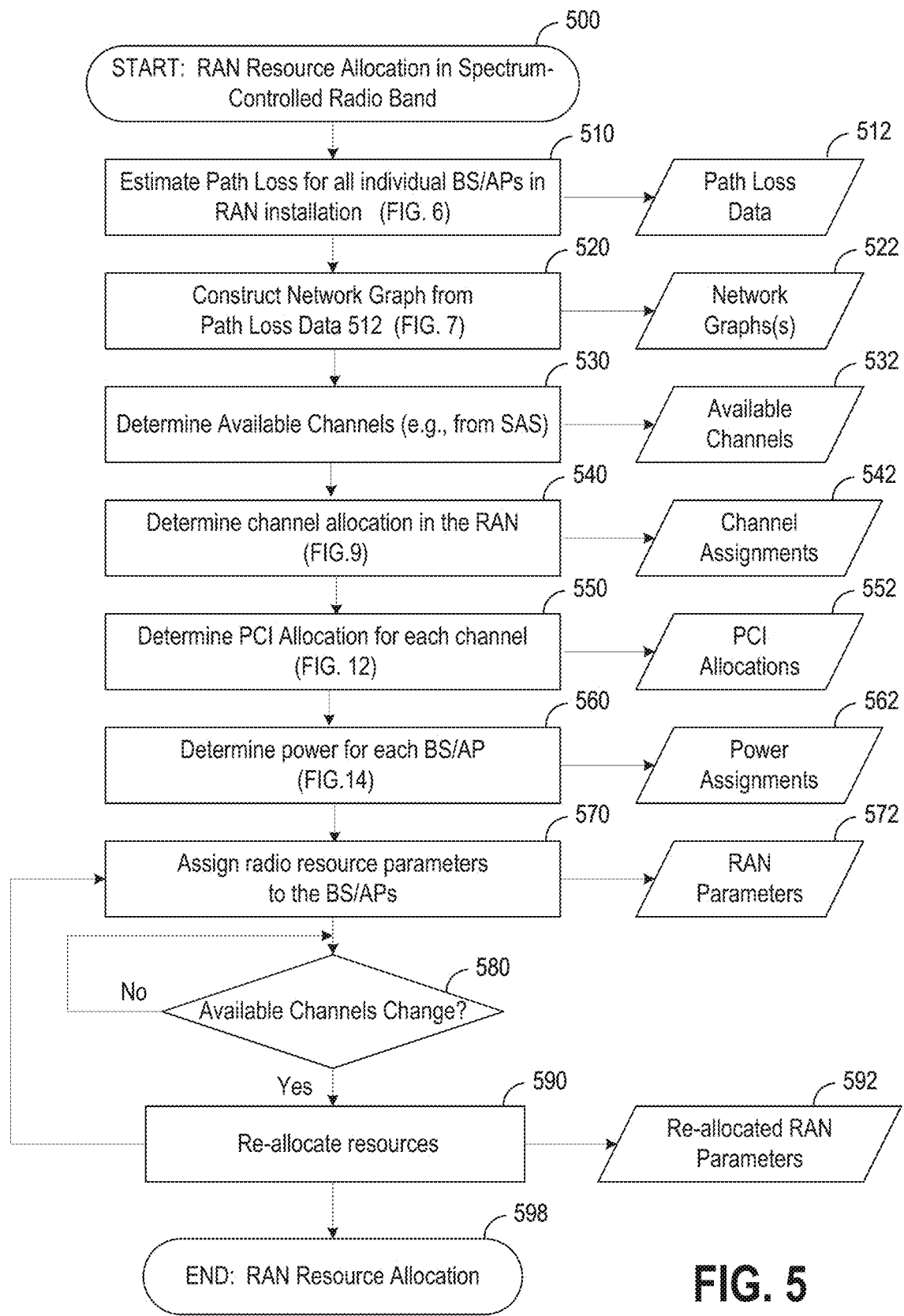
FIG. 5 is a flowchart that outlines the basic steps that describe an algorithm to allocate resources in a spectrum-controlled radio band.

FIG. 5 is a flowchart that outlines the basic steps that describe an algorithm to allocate resources in a spectrum-controlled radio band while initially deploying a network and continuously making adjustments without the need for significant manual intervention. The overall algorithm, starting at STEP 500, includes the following basic steps. These steps are typically performed in this sequential order, but may be performed in any suitable order:

Estimate Path Loss (STEP 510), which generates Path Loss Data 512;
Construct a Network Graph (STEP 520) responsive to the Path Loss data 512, to generate one or more Network Graph(s) 522;
Determine channels available (STEP 530) by for example communicating with an SAS (in a CBRS implementation), to provide Available Channels 532;
Determine channel allocations in the RAN (STEP 540), to generate Channel Assignments 542;
Determine PCI Allocations for each channel (STEP 550); to generate PCI Allocations 552; and Adjust power between the BS/APs in the RAN (STEP 560), to generate Power Assignments 562.

The generated resource parameters are then utilized in the RAN deployment to radio resource parameters: assign channels, PCIs, and power to the BS/APs in the RAN (STEP 570). These resource parameters (Channel Assignments 542, PCI Allocations 552, and Power Assignments 562) may be referred to collectively as RAN Parameters 572. The enterprise network then uses these RAN Parameters 572 to operate the network.

If the available channels change (STEP 580) or if radio conditions change; e.g., if the SAS issues a channel termination order, then the resources (channels, power, etc.) can be re-allocated (STEP 590) using information including the Network Graphs 522 from the previous steps, which advantageously can save time in re-organizing the network. The re-allocated RAN Parameters 592 are then assigned and utilized for continuing network operations. Operation ends at 598.

Each step is described in more detail herein with reference to the following flowcharts. Operations are performed in any suitable units in the Core Network, RAN, or Network Orchestrator, an example of which is described with reference to FIG. 29.

(8) Estimate Path Loss for Each BS/AP at Campus Location

Figure 6:
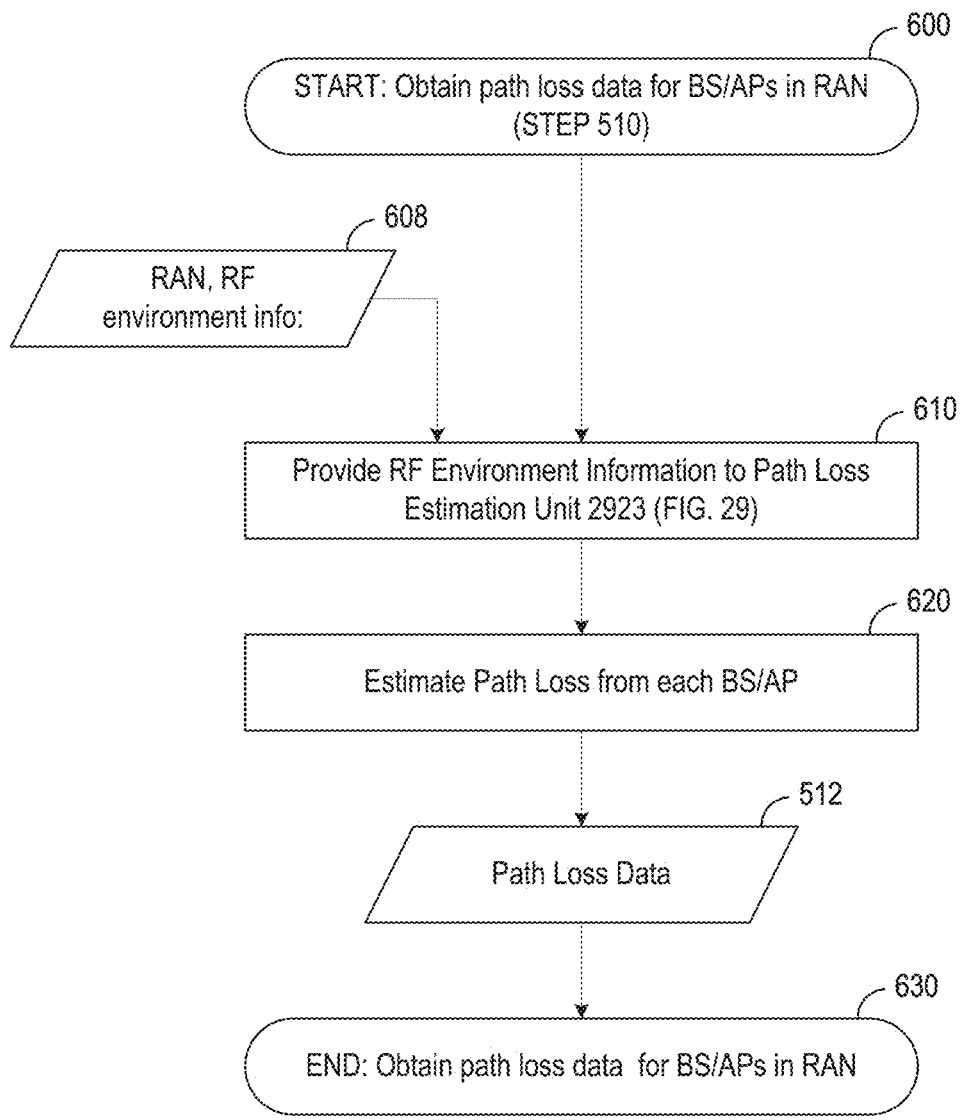
FIG. 6 is a flowchart showing steps to estimate path loss data for each BS/AP in the RAN deployment.

FIG. 6 is a flowchart showing step 510 shown in FIG. 5, which is to estimate path loss data for each BS/AP in the RAN deployment. Advantageously, path loss can be estimated before actual deployment of the BS/APs, during deployment, or after deployment. Estimated path loss data includes an estimate of the signal loss that occurs after the signal is transmitted from each BS/AP, given the RF environment in which the BS/APs are situated, in the campus location. The path loss data is in any suitable form, such as path-loss predicted RSRP values, and may be in a CSV format or other table or database format. The path-loss data provides the input needed to create the path-loss data 512. In a preferred embodiment, the path-loss data that may be in the form of a predicted RSRP values output.

Figure 29:
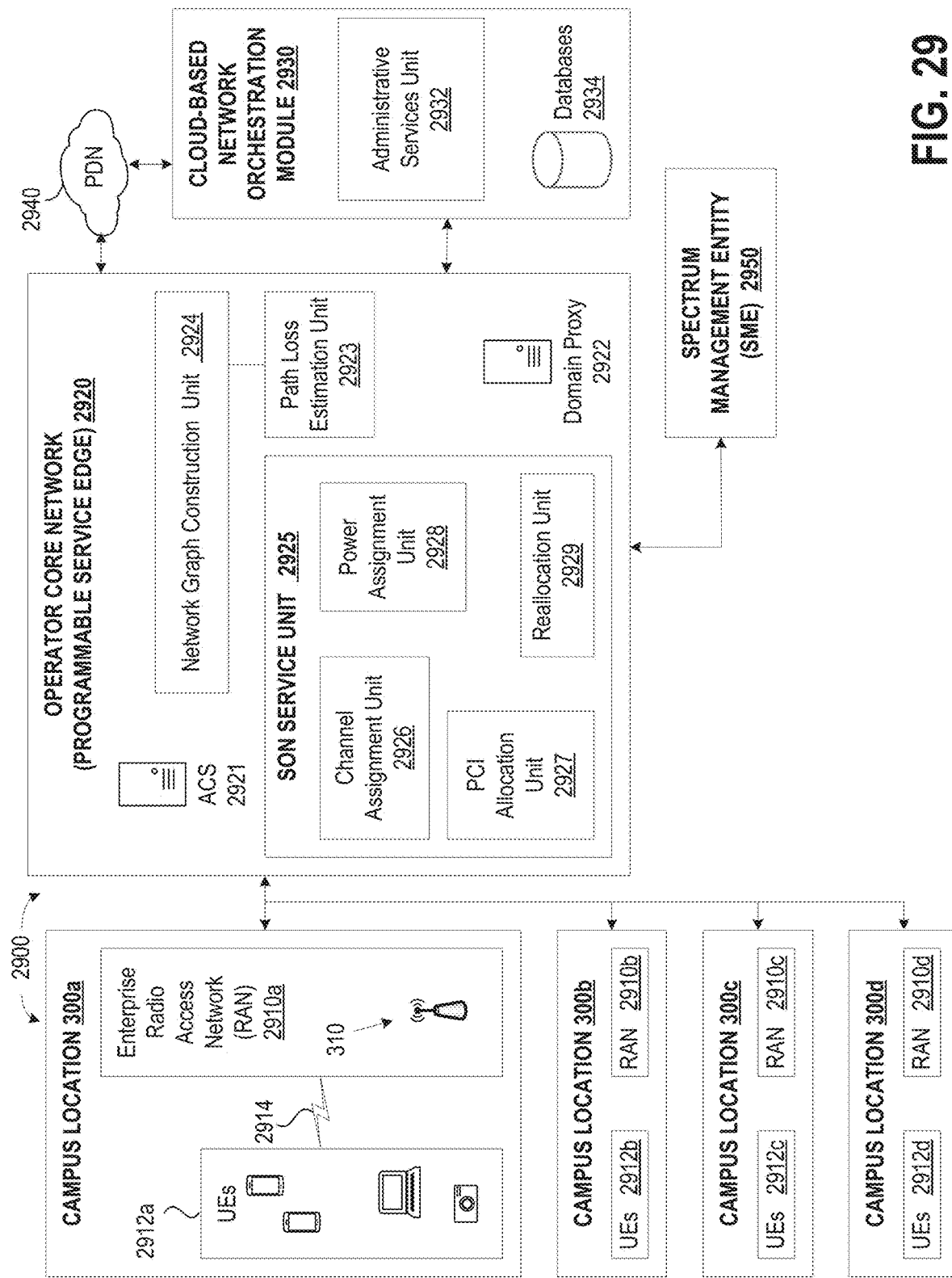
FIG. 29 is a block diagram of an implementation of an Enterprise Network (EN) that includes units for allocating and reallocating RAN parameters.

To generate path-loss data, a description 608 of the environment may be provided by user input or another source. For example, the user's inputs can include wall placement, material selection (e.g., metal or wood), elevator shafts, stairs, layout, dimensions, etc. The environment information is provided to the path loss estimation unit 2923 (FIG. 29). Responsive to these inputs, utilizing any available software, such as the Ib Wave RSRP path loss simulator tool, the path-loss output 512 is generated. Operation is now complete (STEP 630) and the path-loss data output 512 is available to be utilized in the following steps in the algorithm.

In one embodiment, the path loss estimation method is capable of making predictions in diverse environments (e.g., the environment may include a variety of materials, such as wood, concrete, etc., in various configurations). For example, given data (e.g., CSV) files having the same number of columns and rows that have path-loss predicted RSRP values for the BS/APs from an entire deployment, the following algorithm can be utilized to extract properties of the path-loss predictions. As will be described these predictions can then be used to determine channel assignments, inter-frequency channel allocations, PCI allocations, and power assignments.

(9) Network Graph Construction

Figure 7:
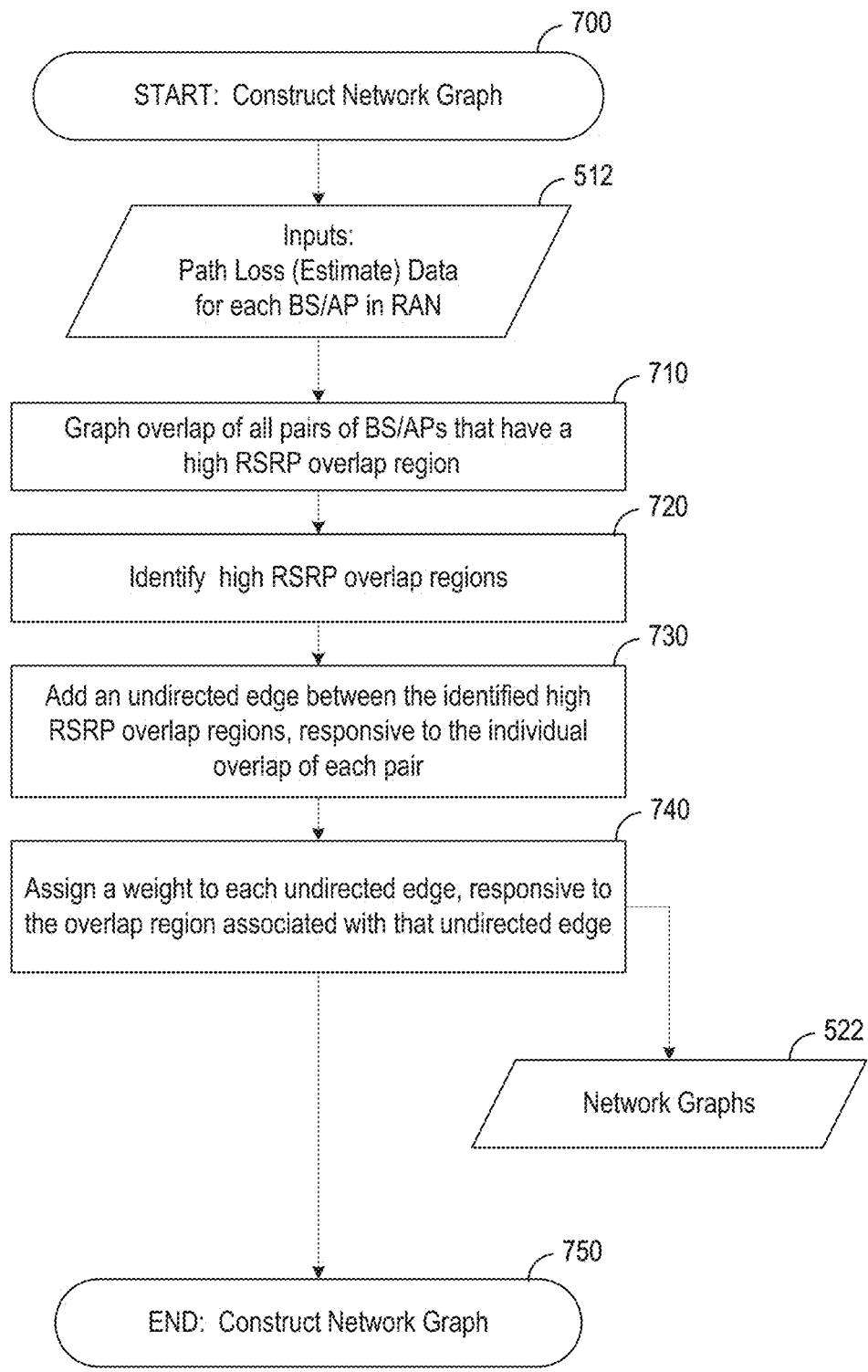
FIG. 7 is a flowchart of operations to construct a network graph responsive to the path-loss data.
Figure 8:
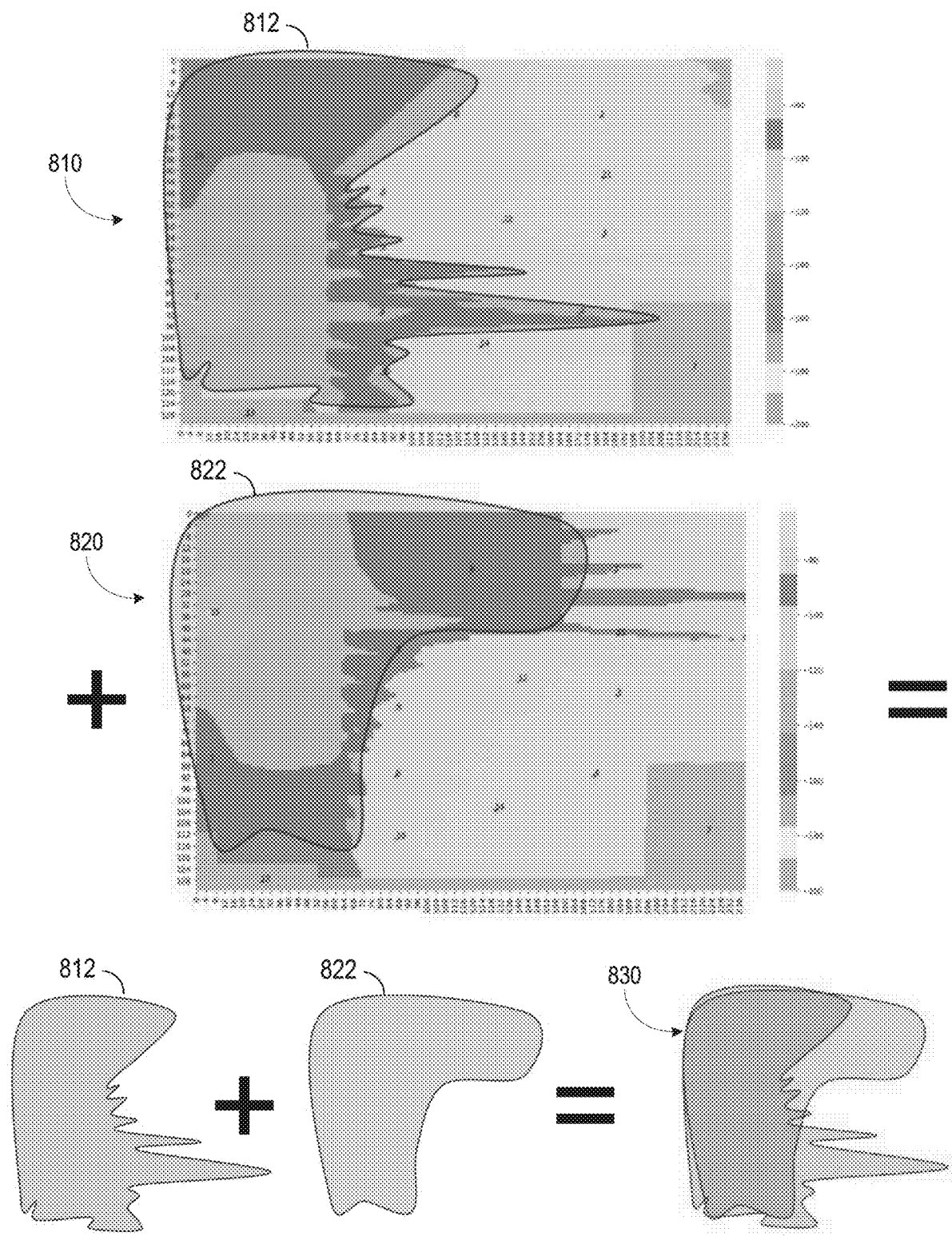
FIG. 8 is a diagram of an example of the network graph construction process, illustrating how predicted path loss measurement can be combined to generate a network graph.

FIG. 7 is a flowchart of operations to construct a network graph responsive to the path-loss data 512, and FIG. 8 is an example of the network graph construction process. In one embodiment, the network graph may be constructed responsive only to the path-loss data.

As discussed above, each one of the CSV files can represent the path-loss data from a single BS/AP. Generally, the path-loss data in all these CSV files is supplied to the algorithm and then the files are processed together to extract additional properties, to create the network graph. Such properties include:
1. RSRP contour levels for all BS/APs;
2. Areas of high overlap between pairs of BS/APs based on RSRP thresholds (this is used for adjacency list detection for a standard network graph); and
3. Handover Regions between pairs of BS/APs based on threshold levels.

Generally, the network graph construction algorithm takes the overlap of all pairs of high RSRP (e.g., above threshold such as average) overlap regions (STEP 710). High RSRP overlap regions are identified (STEP 720). An undirected (each node can see the other) edge is added between the two BS/APs (called nodes in the network graph) responsive to the overlap of each pair (STEP 730). Each edge of the network graph is assigned an edge weight determined by a suitable metric (STEP 740). In one embodiment for example, we can use metrics such as 1) percent of overlap of RSRP values with a threshold across a pair of BS/APs. We can also use a metric that is 2) an absolute tally of overlapped points in the high RSRP threshold region. Only one metric is needed to define an edge weight, and only one is typically used. The metric could be absolute or could be percent or relative. The result is a network graph 522. Operation to construct the graphs is now complete (STEP 750).

FIG. 8 is a diagram of an example of network graph construction, showing an equation in the process of determining adjacency between a pair of BS/APs' predicted path loss measurements. Data drawn from expeditors is visible in the graphs 810 and 820, in terms of the RSRP Heatmaps for the BS/APs in the RAN. Contours are then chosen, for example two contours of the same RSRP threshold (e.g.; −100) may be chosen. The first graph 810 shows a contour coverage outline 812 of a first BS/AP, the second graph 820 shows a contour coverage outline 822 of a second BS/AP.

The chart 830 shows the overlap between the contours of the first and second BS/APs. This overlap is examined carefully and determines adjacency. If the measure of the overlap is greater than a threshold, then an edge is assigned between the first and second BS/APs.

(10) Channel Assignment to BS/APs

Figure 9:
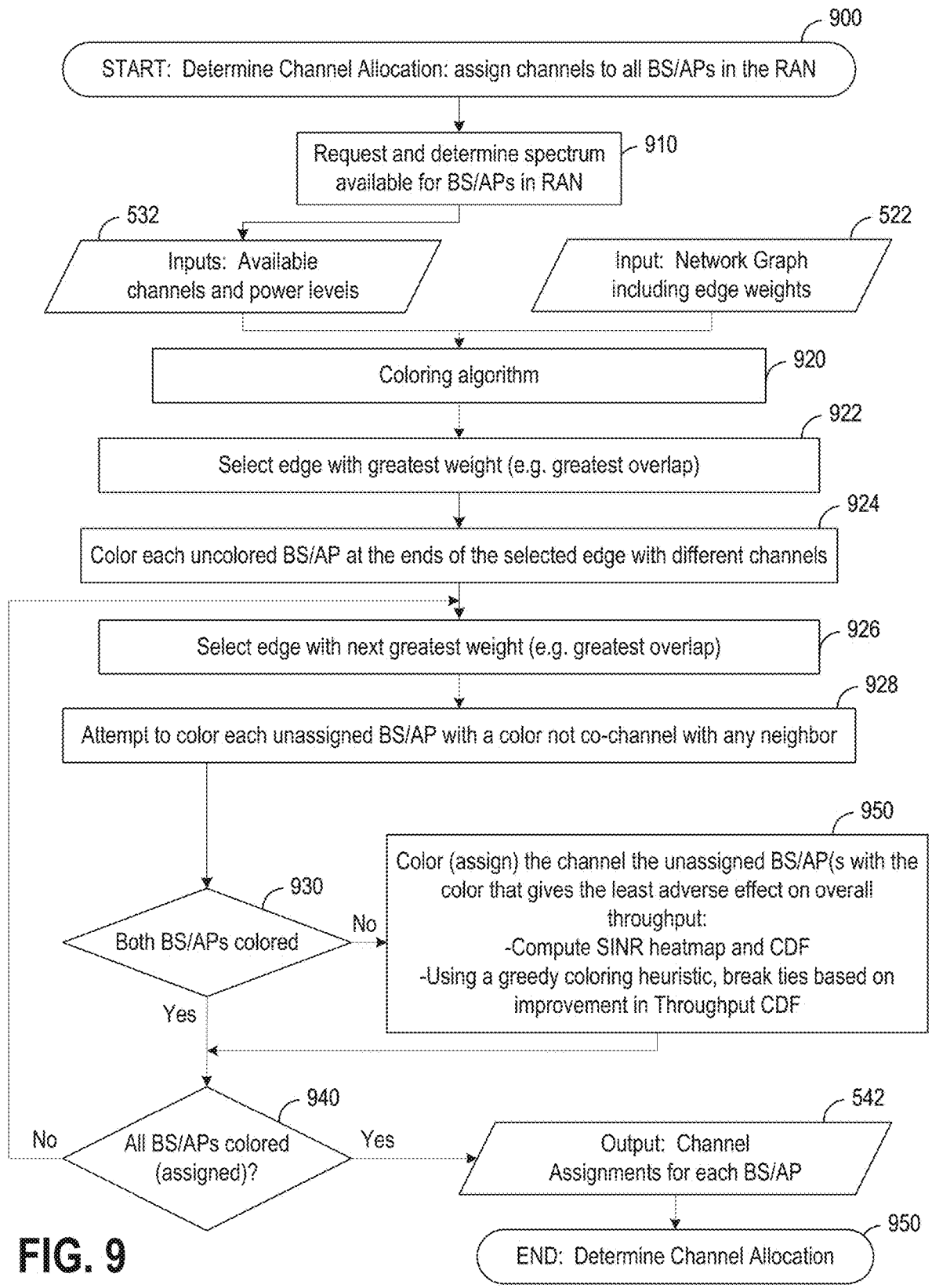
FIG. 9 is a flowchart of operations to allocate channels to the BS/APs in the RAN.
Figure 10A:
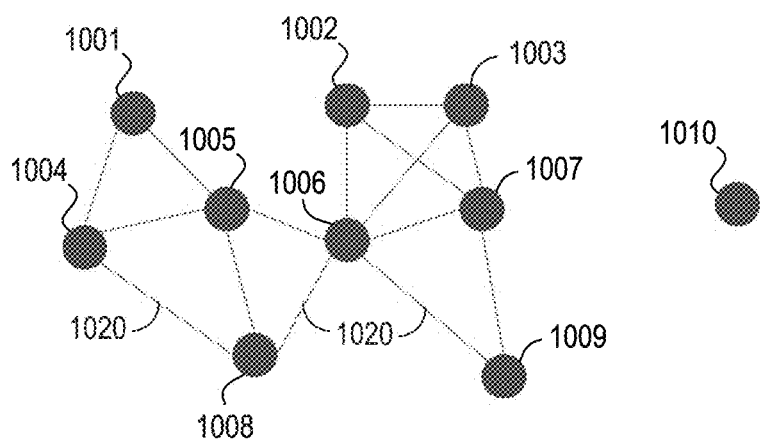
FIGS. 10A through 10S illustrate an example of series of sequential graph operations to allocate channels.
Figure 10B:
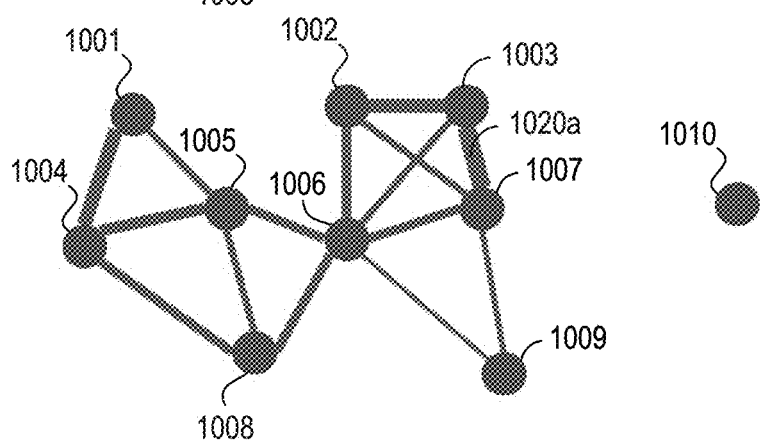
FIG. 10B is a diagram of the network graph, illustrating weights of the connections between BS/APS with line thicknesses.
Figure 10C:
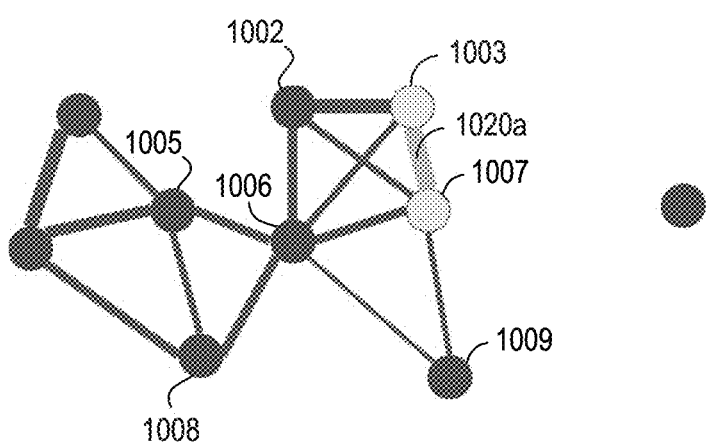
FIG. 10C is a diagram of the network graph in which the strongest weight connection is highlighted in yellow, and the BS/APs on either side can be assigned channels.
Figure 10D:
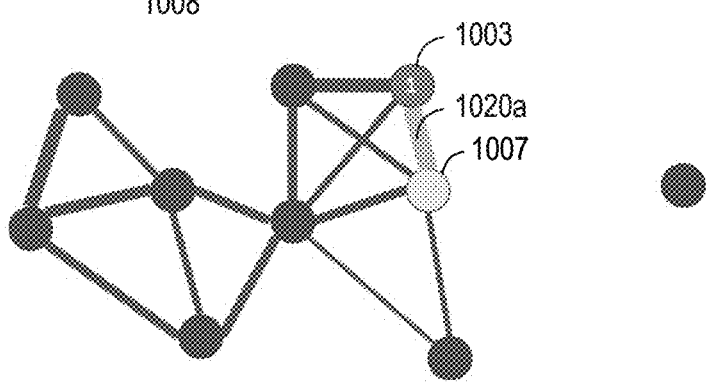
FIG. 10D is a diagram of the network graph showing the first channel pair is assigned to the BS/AP indicated by a green circle with a "1" inside.
Figure 10E:
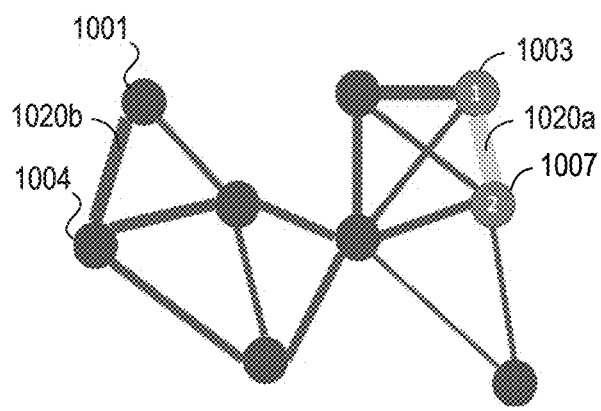
FIG. 10E is a diagram of the network graph, showing another channel pair assigned to the BS/AP on the other side of the connection.
Figure 10F:
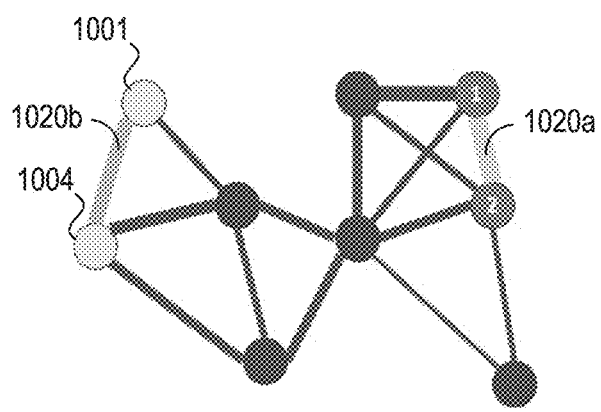
FIG. 10F is a diagram of the network graph showing the next strongest weight connection highlighted in yellow, illustrating that the BS/APs on either side will next be assigned channels.
Figure 10G:
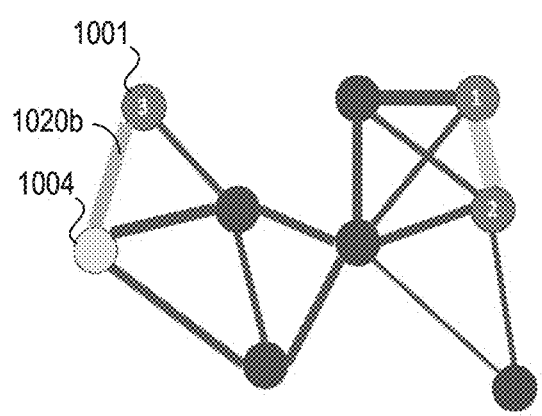
FIG. 10G is a diagram of the network graph showing a channel pair assigned to the BS/AP indicated by a green circle.
Figure 10H:
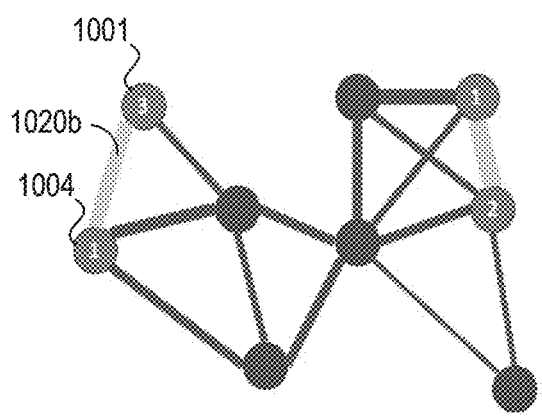
FIG. 10H is a diagram of the network graph, showing a channel pair assigned to the BS/AP on the other side of the connection.
Figure 10I:
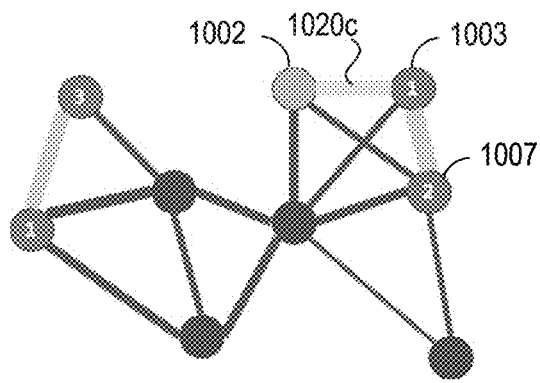
FIG. 10I is a diagram of the network graph showing the next strongest weight connection highlighted in yellow, illustrating that the BS/APs on either side will next be assigned channels.
Figure 10J:
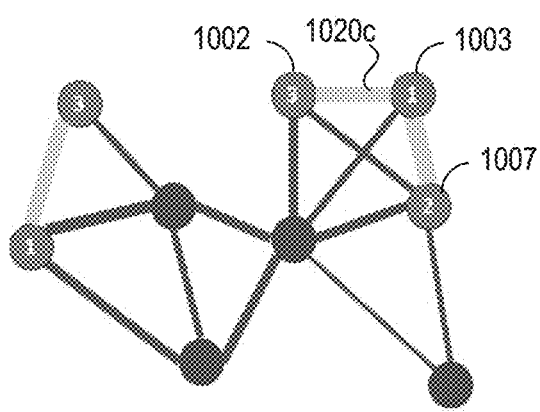
FIG. 10J is a diagram of the network graph showing a channel pair assigned to the next BS/AP, as indicated by a green circle.
Figure 10K:
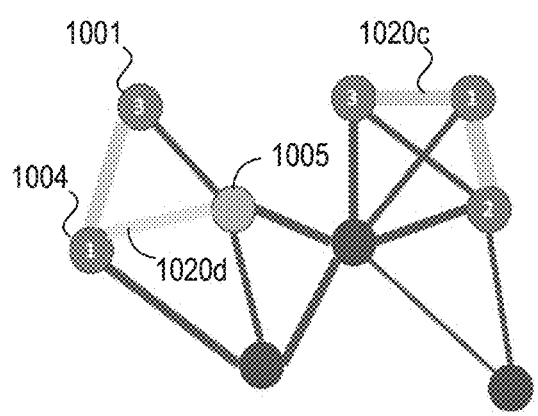
FIG. 10K is a diagram of the network graph showing the next strongest weight connection highlighted in yellow, illustrating that the BS/APs on either side will next be assigned channels.
Figure 10L:
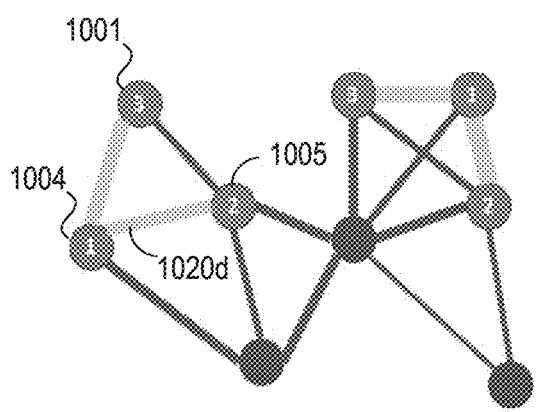
FIG. 10L is a diagram of the network graph showing a channel pair assigned to the next BS/AP.
Figure 10M:
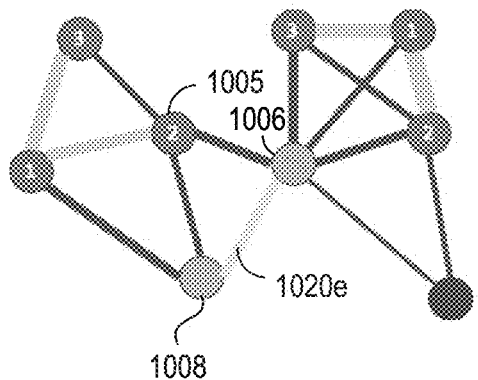
FIG. 10M is a diagram of the network graph showing the next strongest weight connection highlighted in yellow, illustrating that the BS/APs on either side will next be assigned channels.
Figure 10N:
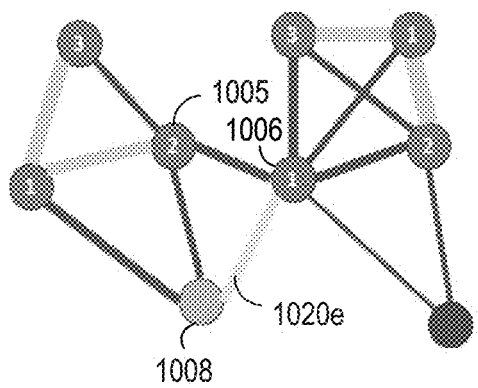
FIG. 10N is a diagram of the network graph showing a channel pair assigned to the next BS/AP.
Figure 10O:
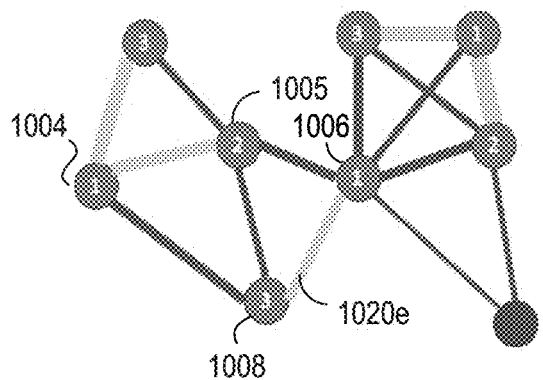
FIG. 10O is a diagram of the network graph showing a channel pair assigned to the BS/AP on the other side of the connection.
Figure 10P:
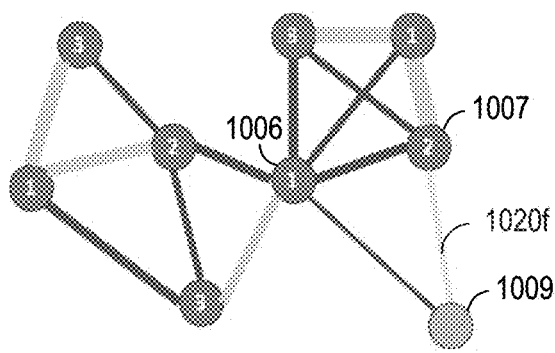
FIG. 10P is a diagram of the network graph showing the next strongest weight connection highlighted in yellow, illustrating that the BS/APs on either side will next be assigned channels.
Figure 10Q:
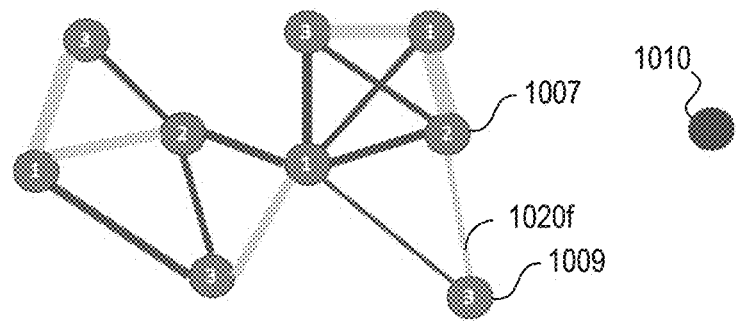
FIG. 10Q is a diagram of the network graph showing a channel pair assigned to the next BS/AP.
Figure 10R:
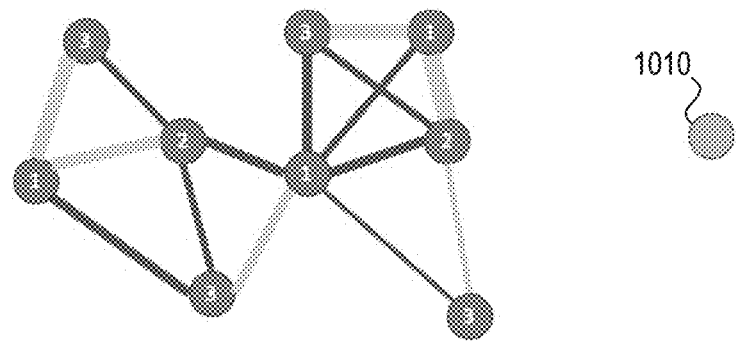
FIG. 10R is a diagram of the network graph showing a channel pair assigned to the BS/AP on the other side of the connection.
Figure 10S:
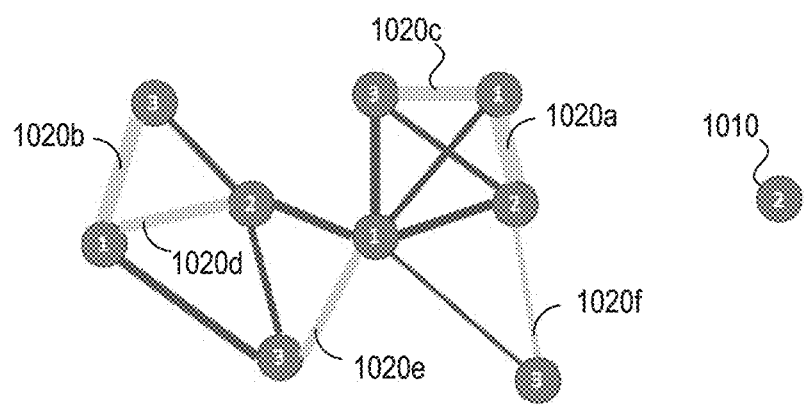
Figure 11:
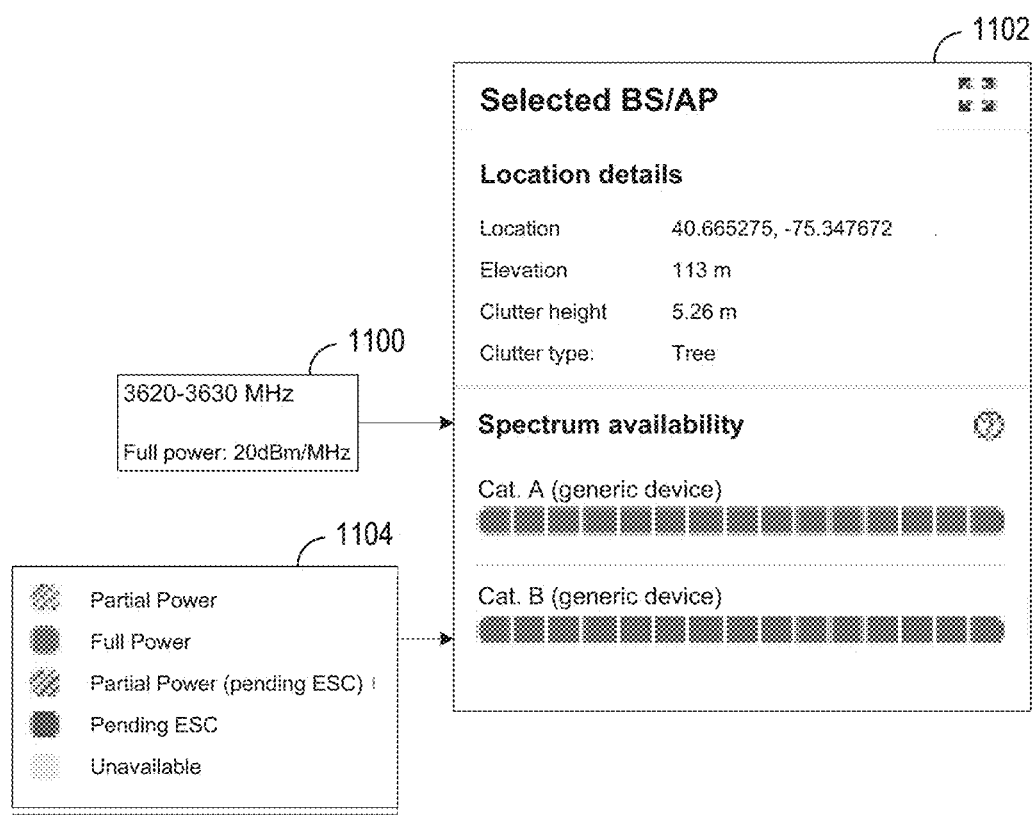
FIG. 11 is an example of a channel assignment made to one BS/AP.

FIGS. 9, 10A-10S, and 11 illustrate a channel assignment algorithm. Particularly, FIG. 9 is a flowchart of operations to allocate channels to the BS/APs in the RAN. FIGS. 10A-10S illustrate a series of graph operations to allocate channels to BS/APs, in one example. FIG. 11 is an example of a resulting assignment to one BS/AP.

FIG. 9 is a flowchart of operations to allocate channels to the BS/APs in the RAN. This algorithm's goal is to assign spectrum (e.g., channels and power levels) to all BS/APs in the deployment (STEP 900) to effectively utilize a certain (limited) amount of available spectrum. The available spectrum may change over time, such as in a CBRS system. As will be described, a coloring algorithm may be used to sequentially color the BS/APs in the Network Graph(s) utilizing a greedy coloring heuristic, starting with the strongest edge weight, and following in descending order of edge weights. FIG. 9 provide a flowchart of the assignment process; FIGS. 10A-10S provide an example and more detail of the assignment process.

The first step in allocating channels is to request and determine the available spectrum (STEP 910). In the CBRS example, the available spectrum is provided to the Enterprise Network (EN) by the Spectrum Access System (SAS 232, FIG. 2), in response to queries by the domain proxy of the EN. (See FIG. 29 for an embodiment of an Enterprise Network 2900).

The constructed network graph(s) 522 for all the BS/APs in the RAN are then provided as inputs to the coloring algorithm (STEP 920). The available channels and power levels 532 are also provided as input from STEP 910. It is assumed that the number of available channels is at least two, and typically will be three or more. Each color represents a different channel. These inputs are provided to the coloring algorithm (STEP 920), which then proceeds to sequentially color the BS/APs with connecting edges, starting with the two BS/APs that are connected with the strongest edge weight (STEP 922). Each of these two BS/APs connected by the strongest edge weight will be allocated orthogonal frequencies (different channels), so that the channels won't interfere with each other, or at least interference will be minimized. Since these two BS/APs have not been colored yet, the algorithm colors the nodes at either end of the edge with two different channels (STEP 924).

Next an edge is selected that has the next greatest weight (STEP 926). If either of the BS/APs on the ends of this next edge has not already been assigned, an attempt is made to color the unassigned BS/AP(s) (STEP 928). Generally, in attempting to color a BS/AP in this STEP 928, it will be colored with a channel that is not co-channel (i.e., not the same channel) as any of the neighbors to the BS/AP that have been colored (i.e., assigned a channel). The neighbors to a particular BS/AP are other BS/APs connected by an edge to that particular BS/AP, so if any of those neighbors have been previously assigned a channel, those previously-assigned channels will not be assigned to in this STEP 928. If no co-channel issue exists (i.e., if there are available channels that are not co-channel), then the least frequently used, non-co-channel available color may be assigned.

If this attempt (STEP 928) results in both BS/APs being colored (STEP 930), and there are more BS/APs to color (STEP 940), then the edge with the next greatest weight is selected (STEP 926), and the process is repeated following in descending order of edge weights until all BS/APs have been colored. Note that as we look at each of the edges in descending order, we will skip over any edges that already have both BS/APs previously assigned. Based upon the results, channels are allocated (e.; assigned) to each of the BS/APs, i.e., the channel assignments 542 for each BS/AP are known and operation ends (STEP 950)

However, in some instances for a given node (BS/AP) there may be too many incident edges with colored nodes on the other end (i.e., there may be no available channels that are not co-channel), and therefore the previous process will not be able to assign a color. The consequence is that, at STEP 930 one or both of the BS/APs on the ends of a selected edge will not yet be colored. In that instance, from STEP 930, the channel with the least effect on overall throughput may be assigned to the node (BS/AP) in question. In that instance the result may be determined iteratively by trying out all available channels for that node, then computing the SINR heatmaps and throughput CDFs, and determining which channel provides the best result. After both BS/APs have been assigned a color, in the output, one or more channels are allocated to each BS/AP, and then operation continues (STEP 940) to determine whether or not there are any unassigned BS/APs.

The coloring process described herein may be repeated with various different scenarios, which creates multiple colorings a-priori. For example, the coloring process can be repeated for each discrete total available CBRS spectrum in MHz (10, 20, 30, . . . , 150). These colorings may be used at later time if (and when) the available spectrum changes such as if the SAS issues a termination order. In other words, the multiple-colored graphs for the various scenarios can be stored and if the available spectrum changes, the graphs can be accessed to change the RAN resource allocation in response to the changed available spectrum. The various scenarios arise from the dynamism inherent to SAS control of the CBRS spectrum.

FIGS. 10A through 10S illustrate a series of sequential graph operations to allocate channels, beginning with a previously-determined network graph 522. In this example there are ten BS/APs in the RAN, including a first BS/AP 1001, a second BS/AP 1002, a third BS/AP 1003, a fourth BS/AP 1004, a fifth BS/AP 1005, a sixth BS/AP 1006, a seventh BS/AP 1007, an eighth BS/AP 1008, a ninth BS/AP 1009, and a tenth BS/AP 1010. Each of these BS/APs may also be considered (and referenced) as a "node". In these diagrams, the state of channel assignment to each BS/AP is indicated by color: a red circle in a BS/AP indicates that the BS/AP has not yet been assigned a channel, a yellow circle indicates that the BS/AP is in the process of being assigned a channel, and a green circle indicates that the BS/AP has been assigned a channel. The number within the green circle indicates the channel assigned to the BS/AP. If an edge 1020 is shown between two BS/APs, this indicates some level of coverage overlap between the two BS/APs.

The diagram of FIG. 10A shows the initial network graph 522 in which none of the channels has yet been assigned, and there the red circle indicates that the BS/AP that has not yet been assigned a channel. Each edge 1020 shown between the BS/APs indicates at least some level of coverage overlap between the BS/APs; in FIG. 10A the extent of the coverage overlap has not yet been determined, and therefore each of the edges are illustrated by a thin edge. In this example we assume that we are working with three available channel pairs, in other examples a different number of channel pairs may be available.

The diagram of FIG. 10B indicates the same network graph as in FIG. 10A, but with a difference in that each edge's weight is now represented qualitatively; i.e., the thicker the edge 1020, the stronger the overlap. In FIG. 10B, the edge 1020a, between the third BS/AP 1003 and the seventh BS/AP 1007, is the thickest edge, and has the strongest overlap. The strength of the overlap may be determined by the area of the overlap and the signal strength in that area, for example. In FIG. 10B, none of the BS/APs has yet been assigned a channel. Generally, the channel assignment algorithm works by sequentially assigning the BS/APs on the ends of the edges, in descending order of strength. Note however that as we sequentially look at each of the edges in descending order, we will skip over any edges that already have both BS/APs assigned.

In FIG. 10C, the strongest edge 1020a is highlighted in yellow, between the third BS/AP 1003 and the seventh BS/AP 1007. The BS/APs on either side of the edge 1020*a*; i.e., the third BS/AP 1003 and the seventh BS/AP 1007, can now be assigned a channel.

In FIG. 10D, since the nodes (1003 and 1007) at the end of the edge 1020*a* do not have any neighbors with channel assignments, we may arbitrarily assign the first channel pair 1 to any of the two yellow-connected nodes; in this example the first channel pair is assigned to the third BS/AP 1003, and is indicated by a green circle with a "1" inside.

In FIG. 10E, a channel pair different from the previously assigned channel will be assigned to the seventh BS/AP 1007. In this example the channel pair 2 can be assigned to the seventh BS/AP 1007 since the only neighboring BS/AP with an assigned channel is the third BS/AP 1003, which was previously assigned channel 1.

In FIG. 10F, the next strongest edge 1020*b*, between the first BS/AP 1001 and the fourth BS/AP 1004 is highlighted. The BS/APs 1001, 1004 are also highlighted.

In FIG. 10G the BS/APs 1001, 1004 do not have any neighboring BS/APs with assigned channels. Therefore, we can select either of the BS/APs 1001, 1004 and assign it the channel pair 3, because that is the least frequently used channel pair at this point. In this case, channel pair 3 is assigned to the first BS/AP 1001.

In FIG. 10H, to assign a channel pair to the other BS/AP (the fourth BS/AP 1004), the only neighbor is the first BS/AP 1001, which has channel pair 3, so we can assign the fourth BS/AP 1004 with either 1 or 2, so without loss of generality we can assign channel 1 to the fourth BS/AP 1004.

In FIG. 10I the next strongest edge 1020*c* is situated between the second BS/AP 1002 and the third BS/AP 1003. Note that the third BS/AP has been previously assigned channel pair 1, and the second BS/AP 1002 is unassigned.

In FIG. 10J we see that the second BS/AP 1002 has two neighboring BS/APs (1003, 1007) that have been assigned channel pairs 1 and 2, respectively. Therefore, because there are only 3 available channel pairs in this example, the only remaining available channel pair to assign to the second BS/AP 1002 is channel pair 3.

In FIG. 10K, the next strongest edge 1020*d* is shown between the fourth BS/AP 1004 and the fifth BS/AP 1005. The fourth BS/AP 1004 has previously been assigned channel pair 1, which leaves the fifth BS/AP 1005 to be assigned. In FIGS. 10K and 10L we see that this fifth BS/AP 1005 has two neighbors (1001, 1004) with channel pairs 3 and 1. Therefore the only available channel pair to assign to the fifth BS/AP 1005 is channel pair 2.

In FIG. 10M, the next strongest edge 1020*e* is between the sixth BS/AP 1006 and the eighth BS/AP 1008, neither of which has been assigned a channel pair.

In FIG. 10 we see that the sixth BS/AP 1006 has neighbors that have been assigned channel pairs 1, 2, and 3. Therefore, there is no available channel that would not create a conflict. In this situation, we then compute the SINRs and the throughput CDFs for all three possible channel pairs for that node, and then select the channel pair that provides the best throughput CDF, by e.g., comparing the tail end values of the throughput CDF. In this example, we will assume that channel pair 1 is selected being the best choice, and assigned to the sixth BS/AP 1006.

Turning now to the eighth BS/AP 1008, which is on the other end of the edge 1020*e*, here we see that there are only two channels in the eighth BS/AP's neighbor list and those two channels are channel pairs 1 and 2. Therefore the eighth BS/AP 1008 is assigned channel pair 3.

In FIG. 10P the next strongest edge 1020*f* is between the seventh BS/AP 1007 and the ninth BS/AP 1009. The seventh BS/AP 1007 has been assigned 1007, and the ninth BS/AP is unassigned. In FIGS. 10P and 10Q, we see that the ninth BS/AP 1009 has only two channels in this AP's neighbor list, which are channel pairs 1 and 2. Therefore the ninth BS/AP 1009 is assigned the remaining channel pair, which is channel pair 3.

The diagram of FIG. 10R shows that all BS/APs (nodes) with incident edges have been assigned. Therefore, the algorithm looks for all nodes that had no incident edges, for the purpose of assigning channels to them. In this example, the tenth BS/AP 1010 has no incident edges with any other BS/APs. Although any of the channel pairs might be assigned to a BS/AP that has no incident edges, it is preferable to utilize a selection process to make a better selection. In this example, shown in FIG. 10S, channel pair 2 is assigned to the tenth BS/AP 1010 utilizing the following selection process:

1. We compare all the SINR and throughput CDFs for all possible channel pairs.
2. Channel 2 is the least frequently used channel pair in this deployment so in case of a tie, channel 2 would take precedence over the others.

At this point all the BS/APs have been assigned channels, and the channel assignment selection process is complete.

FIG. 11 is an example of a channel assignment 1100 (3620-3630 MHz) made to one BS/AP at a particular location and elevation 1102. This channel assignment 1100 may result from utilizing the channel assignment algorithm disclosed herein. A legend 1104 shows that the spectrum is available full power.

(11) PCI Allocation

The following provides background for PCI allocations. 4G and 5G networks utilize synchronization signals: in 5G NR the synchronization signals are known as the Primary Synchronization Signal (PSS) and Secondary Synchronization Signal (SSS). These signals provide the following information, which is required by a UE for downlink synchronization:

PSS provides Radio Frame Boundary (i.e., the position of the $1^{st}$ Symbol in a Radio frame);

SSS provides Subframe Boundary (Position of $1^{st}$ Symbol in a Subframe); and

Physical Cell ID (PCI) information using both PSS and SSS.

The Physical Cell Identity (PCI) is used to provide a pseudo-unique value for identifying cells. The PCI value is derived from two components-PSS and SSS. The PSS (Primary Synchronization Signal) has the value 0, 1, or 2. In 5G, the SSS (Secondary Synchronization Signal) can have a value between 0 and 335. Thus, in 5G, the PCI value is =[3× SSS+PSS], resulting in a value between 0 and 1007 (i.e., 5G has 1008 unique PCIs. In 4G, the SSS can have a value between 0 and 168, giving 504 unique PCIs.

Figure 12:
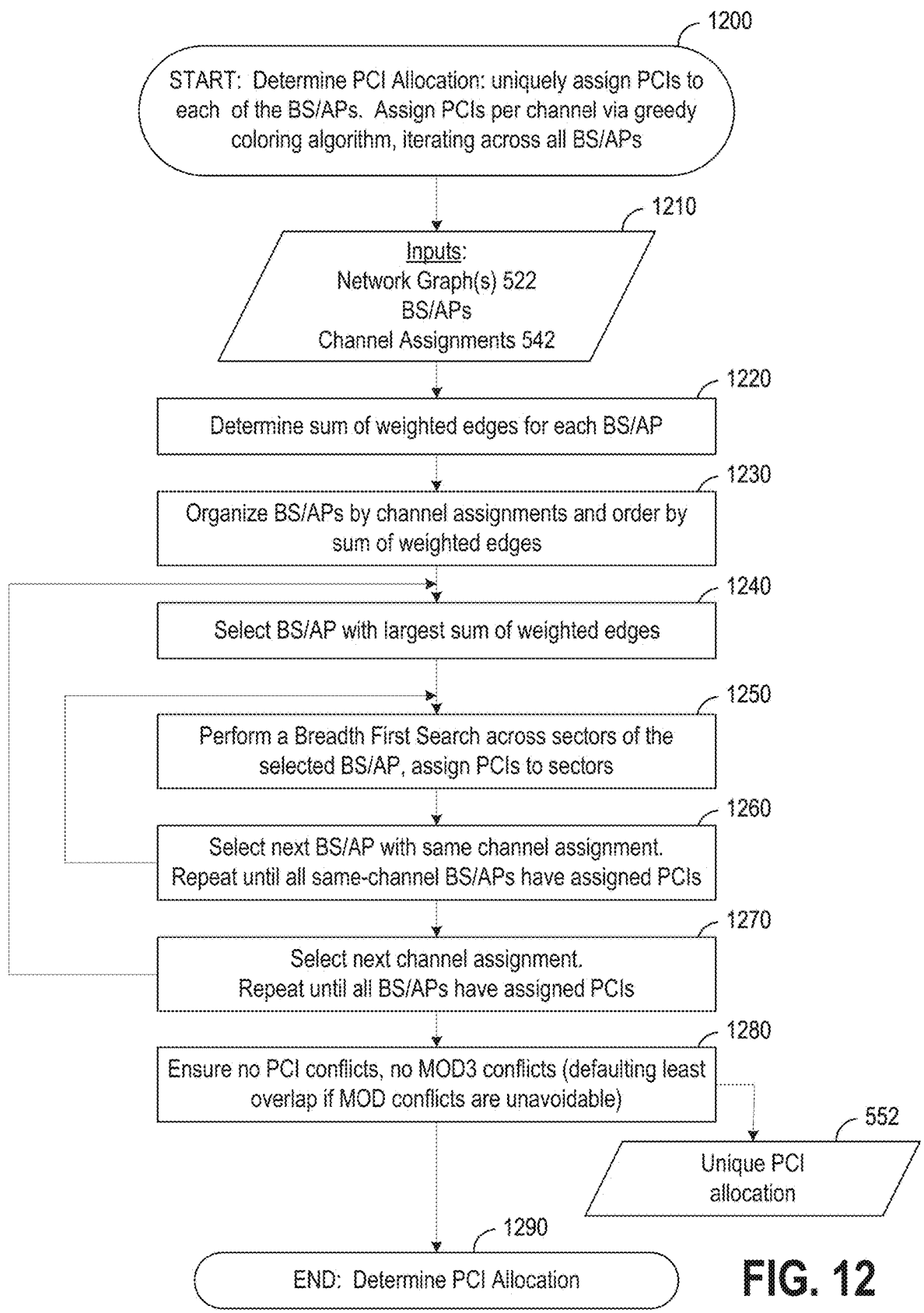
FIG. 12 is a flowchart of operations to assign PCIs.

FIG. 12 is a flowchart of operations to assign PCIs for each sector of the BS/APs. FIGS. 13A-13L illustrate a series of graph operations to assign PCIs to each BS/AP, in one example.

Essentially the PCI allocation algorithm disclosed herein assigns unique PCIs for each sector of a BS/AP by assigning PCIs initially for each channel that has been allocated in the deployment. This works by iterating across all BS/APs, starting with the largest sum of the weighted edges and sequentially working down to the least weighted sum for a BS/AP, and performing a BFS (Breadth First Search) across that BS/AP to assign the PCIs. With limited resources it can be the case that there can be some potential for PCI conflicts, but the most basic PCI conflicts (i.e., MOD 3 conflict) are avoided by assigning the PCI in this BFS manner. Following is an example algorithm that assigns PCIs; note although the algorithm refers to eNodeBs, this should be interpreted as an example, and the principles include all BS/APs.

Following is pseudocode that describes the PCI allocation algorithm:
Initialize SSS=0
For each channel that has been assigned in the channel assignment algorithm:

```
PSS = 0
SSS += 1
# this takes the enodebs with a particular channel and orders them
# in descending order of number of adjacent enodeb
for eNodeB descending order of # of incident edges:
    if eNodeB has already been assigned:
        continue to next eNodeB
    assign pci to eNodeB with PSS + (3 * SSS)
    PSS = (PSS + 1) % 3
    if PSS == 0:
        SSS += 1
    # Now from this first eNodeB we will conduct a Breadth First Search to do the PCI
assignments
    queue = [eNodeB]
    while len(queue) > 0:
        enb = queue.dequeue( )
        for neighbor in enb.neighbors:
            if neighbor does not have a PCI assigned and is co-channel:
                while:
                    assign neighbor with (PSS + 1) % 3
                    PSS = (PSS + 1) % 3
                    if PSS == 0:
                        SSS += 1
                    # check for modular collisions
                    if PCIDict[nbr] % 3 != PCIDict[ap] % 3:
                        break
```

FIG. 12 is a flowchart that illustrates operations to uniquely assign PCIs to the BS/APs (STEP 1200), all of which have been assigned channel pairs. The PCIs are assigned, channel by channel using a greedy coloring algorithm, iterating across all BS/APs.

Inputs 1210 include the network graphs 522, BS/APs, and the channel assignments 542 previously provided. The sum of the weighted edges for each of the BS/AP is determined (STEP 1220). For purpose of iteratively allocating the PCIs, the BS/APs are organized by channel pair assignments and in order of the sum of the weighted edges (STEP 1230), from strongest to weakest sum.

The BS/AP with the largest sum of weighted edges is selected (STEP 1240), and starting with the BS/AP with the largest sum, a BFS search is performed, and a PCI is assigned to the BS/AP responsive to that search (STEP 1250). The next BS/AP in order with the same channel assignment is selected, and STEPs 1250 and 1260 are repeated until all same-channel BS/APs have been assigned PCIs.

After all BS/APs with the first channel assignment have been assigned PCIs, the next channel assignment is selected (STEP 1270) by returning to STEP 1240 and selecting the channel assigned to the BS/AP that has the strongest remaining sum of weighted edges. STEPs 1250 and 1260 are repeated until all same-channel BS/APs have assigned PCIs (STEP 1260), and then another channel assignment is made (STEP 1270). This process is repeated until all BS/APs, for all channel assignments, have been assigned PCIs.

As a final check the resulting allocation can be reviewed to ensure there are no PCI conflicts, no MOD3 conflicts, unless the MOD3 conflicts are unavoidable, in which case the least overlap may be used. (STEP 1280). The PCI allocation process is now complete, PCI allocations 552 are available, and PCI allocation operations end (STEP 1290).

Figure 13A:
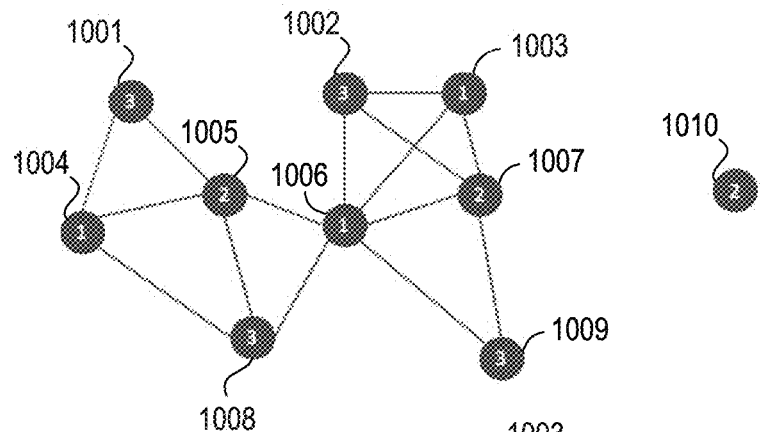
FIGS. 13A-13L are a series of diagrams that illustrate an example of graph operations to assign PCIs to each BS/AP, starting with a network graph and channel assignment.

FIGS. 13A-13L are graphical depictions that illustrate a series of graph operations to assign PCIs to each BS/AP, in one example. FIG. 13A is a graph showing channel assignments, which in this example are the same as those in FIG. 10S. Generally, PCI allocation is performed per channel pair, in order of descending cumulative edge strength, by looking at all the BS/APs that use a particular channel, and then assigning PCIs for those BS/APs (those using the particular channel) by doing a BFS (Breadth First Search) from each starting candidate. If there is no adjacent BS/APs that have the same channel, then there is no branch to explore.

Figure 13B:
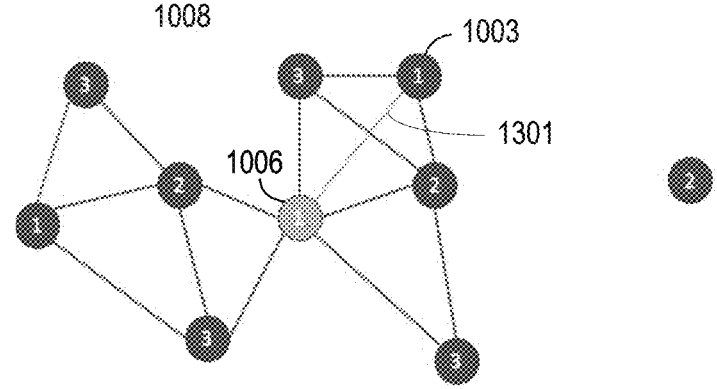

In the graph of FIG. 13B we start with the first channel pair 1. The BS/AP 1006, which is highlighted yellow, has been assigned channel pair, and has the highest incident edge weight. The edge 1301 between the BS/AP 1006 and the BS/AP 1003 is also highlighted yellow, and indicates a branch for the BFS process because BS/AP 1003 is an adjacent BS/AP with channel 1 assigned.

Figure 13C:
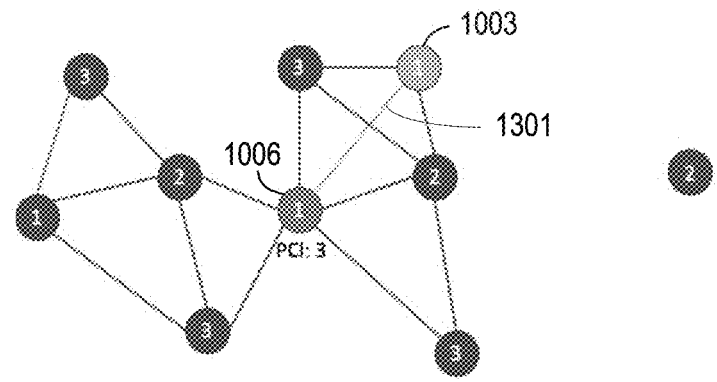

Next, a PCI is assigned to the BS/AP 1006. Because no PCIs have been assigned yet, there can be no PCI conflicts, and therefore we can select and assign an arbitrary PCI. The graph of FIG. 13C shows that, in this example, the BS/AP 1006 is assigned PCI 3.

Figure 13D:
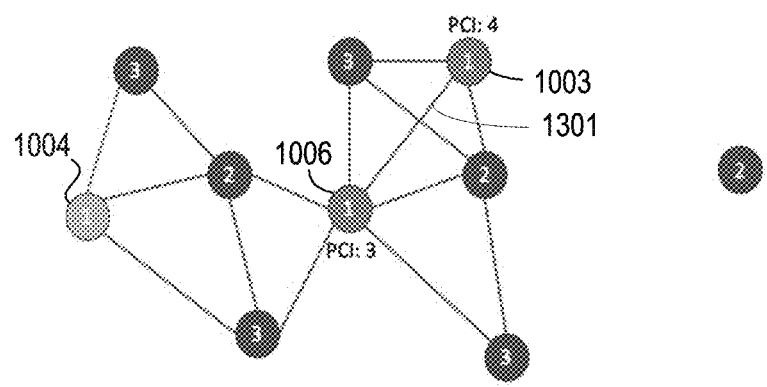

FIG. 13D is a graph that shows the next PCI assignment for channel 1. The BS/AP 1003 has already been assigned channel 1, and is on the other end of the BFS branch from the BS/AP 1006, and therefore it will be the next BS/AP to be assigned a PCI. There is no conflict mod 3 here and thus we can assign the BS/AP 1003 to a PCI (different from BS/AP 1006). In this example the BS/AP 1003 is assigned PCI 4.

We then check the edges from either BS/AP 1006, 1003 to see if there are any BS/APs with channel pair 1 branching from that current level, and there is none. So, we move onto BS/AP 1004, highlighted in yellow in FIG. 13D, which is the next BS/AP that has been assigned channel pair 1.

Figure 13E:
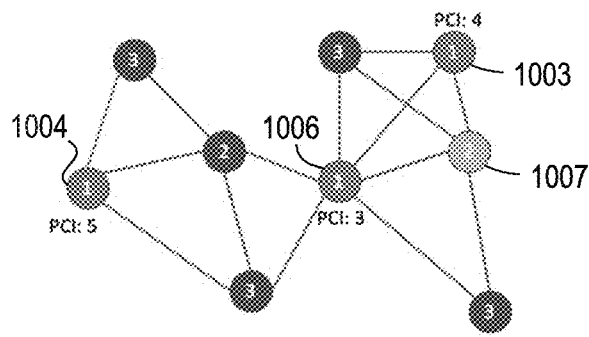

The graph of FIG. 13E shows the assignment of BS/AP 1004. In this example the BS/AP 1004 has been assigned PCI 5 since there are no incident BS/APs that have been assigned channel pair 1. After this assignment, there are no more channel pair 1 BS/APs, so we move on to color BS/APs that have been assigned channel pair 2. The BS/AP 1007, which has been assigned channel 2, is highlighted yellow, and in this example the BS/AP 1007 is assumed to have the greatest edge weights of those BS/APs that have been assigned channel 2.

Figure 13F:
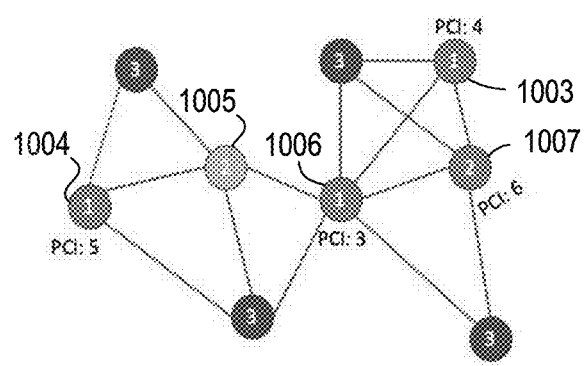

The graph of FIG. 13F shows that this BS/AP 1007 has been assigned PCI 6 since there are no incident BS/APs that have been assigned channel pair 2. Also, we see that there is no branching to consider so we move onto the BS/AP that has the highest incident edge weight, and has been assigned to channel 2, which is BS/AP 1005, and is highlighted yellow in FIG. 13F.

Figure 13G:
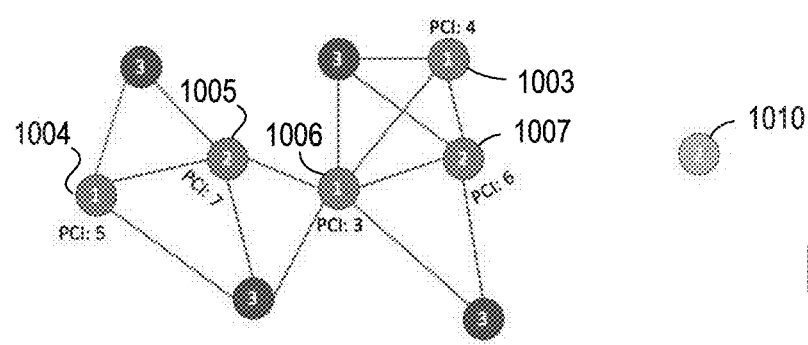

The graph of FIG. 13G shows that this BS/AP 1005 has been assigned PCI 7, because there are no PCI mod 3 conflicts, nor is there any BFS branching. We move onto the isolated BS/AP 1010, which has been assigned channel pair 2, and is highlighted in yellow in FIG. 13G.

Figure 13H:
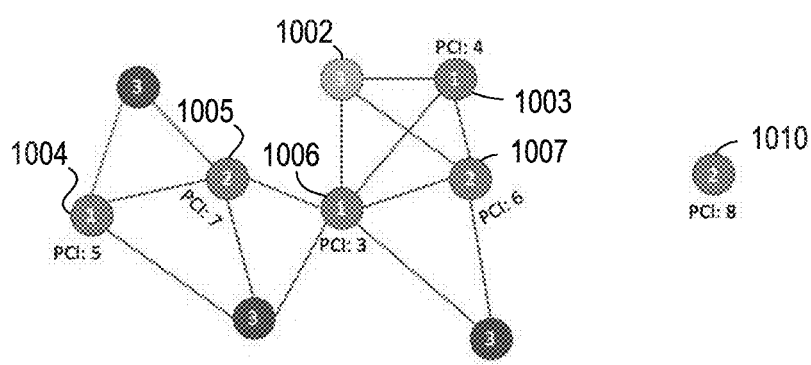

The graph of FIG. 13H shows that the isolated BS/AP is not subject to PCI conflicts due to its isolation, and has been assigned PCI 8. After this assignment, all channel pair 2 BS/APs have been assigned. Therefore, we move on to assign PCIs to channel pair 3 BS/APs. The channel pair 3 BS/AP that has the highest incident edge weight is the BS/AP 1002, and is highlighted yellow in FIG. 13H.

Figure 13I:
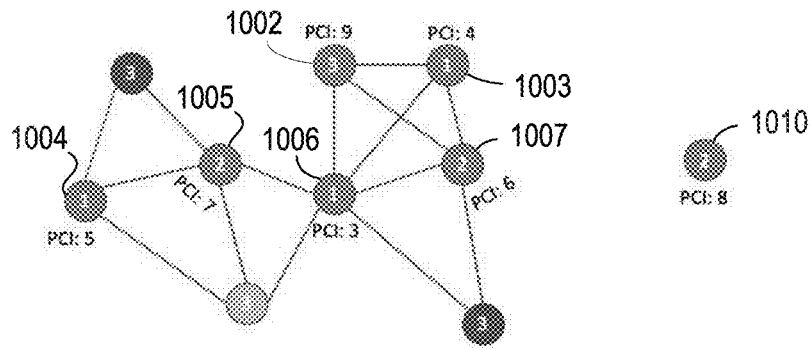
Figure 13J:
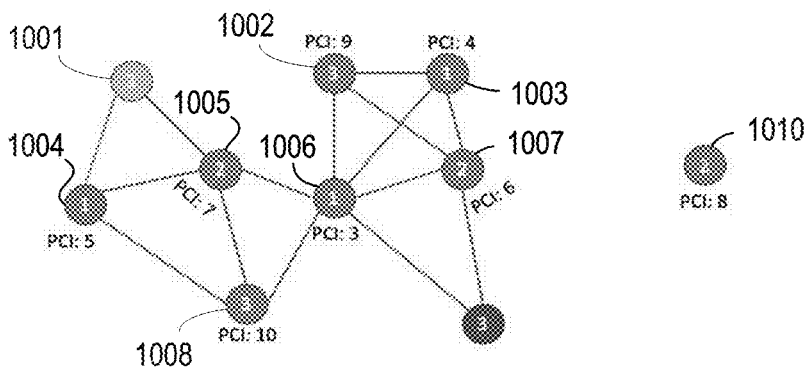
Figure 13K:
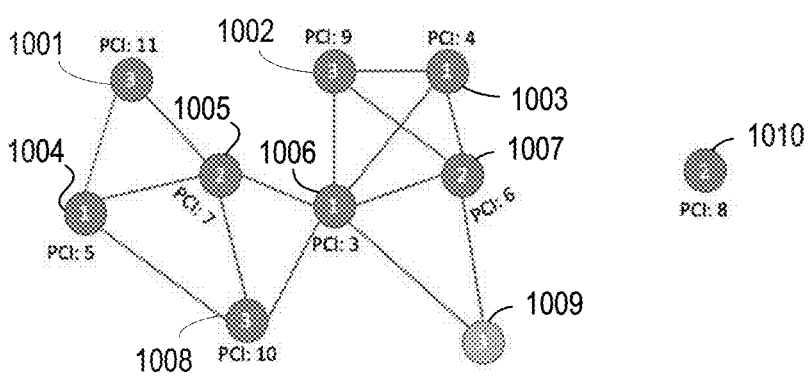
Figure 13L:
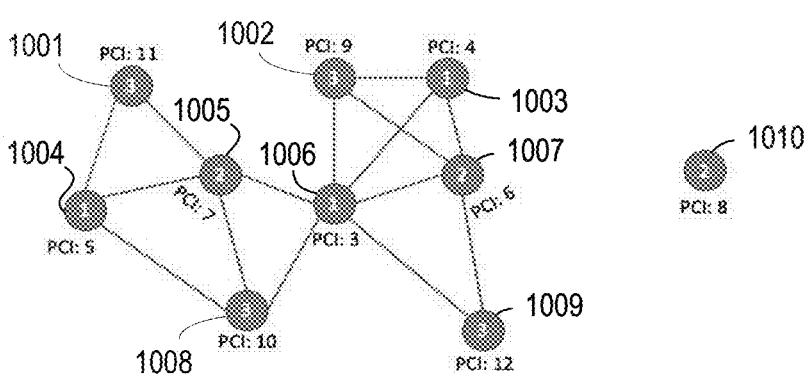

The graphs of FIGS. 13I, 13J, 13K 13L show assignments to the remaining BS/APs, all of which have no incident edges with channel pair 3 neighbors. Particularly, the graph of FIG. 13I shows that BS/AP 1002 has been assigned PCI 9, because there are no PCI mod 3 conflicts, nor is there any BFS branching. Similarly, the graph of FIG. 13J shows that BS/AP 1008 has been assigned PCI 10; the graph of FIG. 13K shows that BS/AP 1009 has been assigned PCI 11; and the graph of FIG. 13L shows that BS/AP 1002 has been assigned PCI 12.

PCI assignment is now complete, and we move on to power assignment.

(12) Power Assignment to BS/APs

Figure 14:
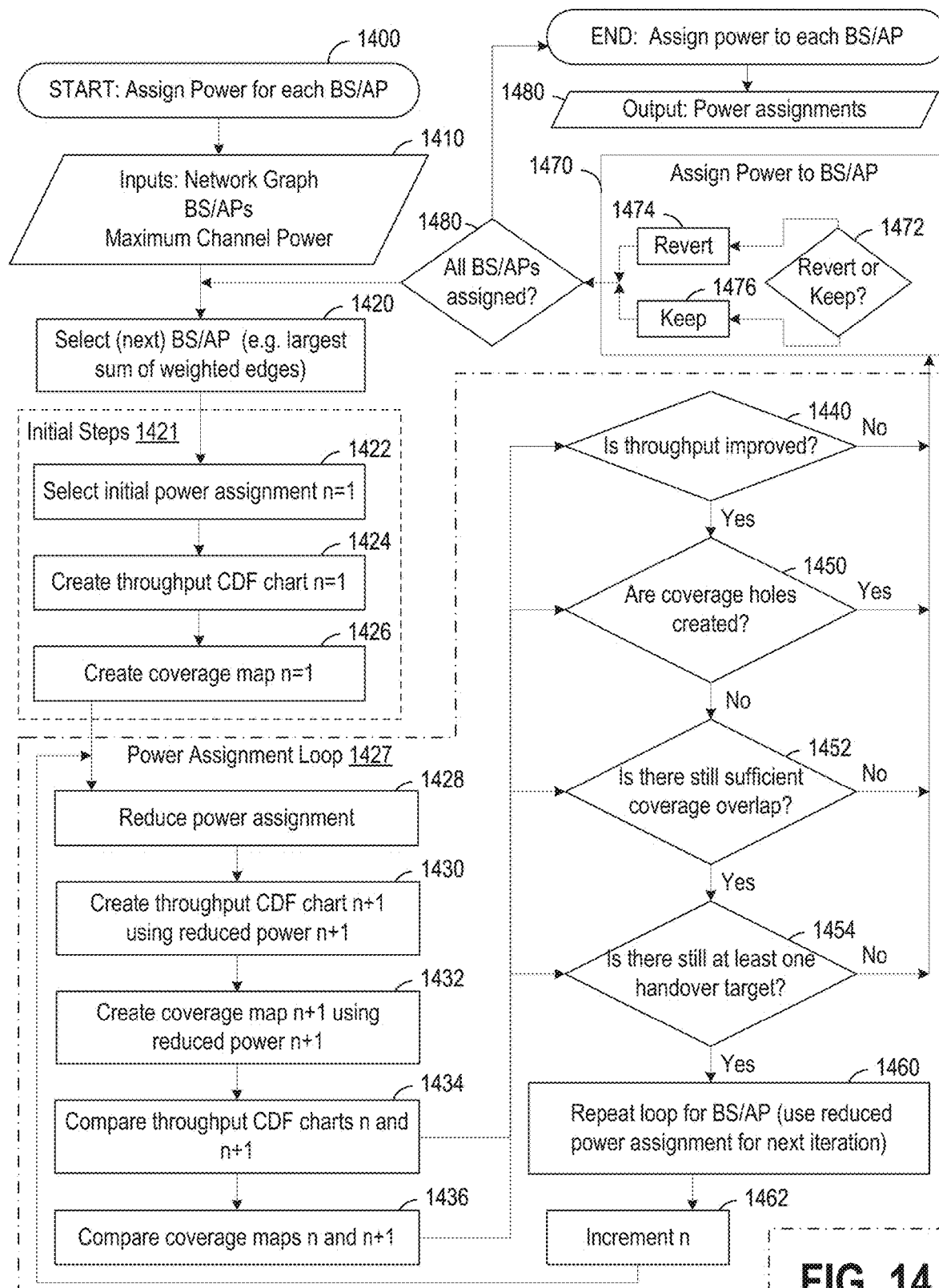
FIG. 14 is a flowchart showing power assignment operations, to assign power to all BS/APs in an enterprise's RAN.

FIG. 14 is a flowchart showing power assignment operations, which assign power to all the BS/APs in an enterprise's RAN (STEP 1400). The inputs 1410 to the power assignment operations include the previously-created network graph(s) 522, the channel assignments 542, and the information and specifications for each of the BS/APs in the RAN, including their maximum channel power.

Generally, the power assignment algorithm selects a BS/AP, performs operations to assign power, loops back to select a next BS/AP and assigns power to that BS/AP, and then repeats until all BS/APs in the RAN have been assigned power. To assign power to each BS/AP, the power assignment strategy is to incrementally and gradually reduce the power assigned, and review the results in terms of throughput changes, coverage holes, coverage overlap, and handover targets. If the power assignment reduction creates significant coverage holes, significantly reduces coverage overlap, eliminates handover targets, or reduces throughput in a significant way, then further power reduction may be stopped for that BS/AP, and the power assignment can be reverted to a previous value. In other words, the reduction in assigned power may be reversed; i.e., the power assignment may be increased back to its previous value after reviewing the results and determining that reducing power provides no improvement, or problems like coverage holes are created by reducing the power. In many embodiments; the power assignment algorithm will reduce power for a single BS/AP until that reduction results in one or more of the unfavorable scenarios, and when it reaches the unfavored scenario it will specifically revert to the most recent previous value.

In FIG. 14, power assignment operations begin by selecting one of the BS/APs in the RAN (STEP 1420). Typically, the selection process includes selecting the unassigned BS/AP that has the highest edge weight sum. It is believed that the edge weights are indicative of interference, and therefore the highest edge weights indicate the BS/APs that may cause the most interference. By starting with the BS/AP that causes the most interference (i.e., the most interference-causing BS/AP in the deployment), assigning power, identifying the next most interference-causing BS/AP, assigning power, and then identifying and assigning power successively to each unassigned BS/AP in descending order based on the sum of the edge weights for that given BS/AP, we identify the BS/APs that are most likely to cause poor SINR values in the overall grid, and therefore, when we decrease each BS/AP's power in the power assignment loop, there will be a greater likelihood of improving the throughput of the deployment.

Figure 15:
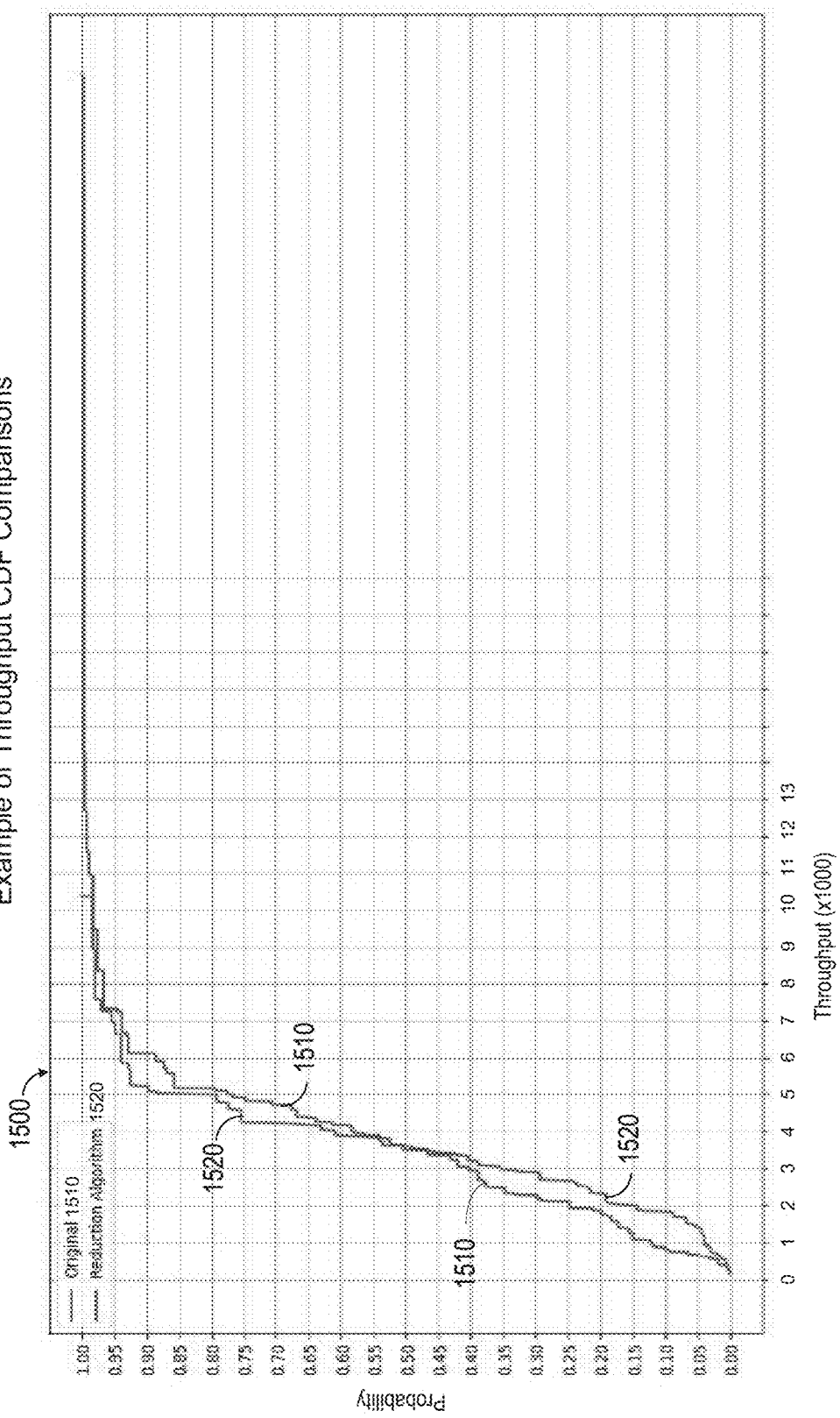
FIG. 15 is a throughput CDF chart that shows an example of a comparison of two DL throughput CDFs.
Figure 16:
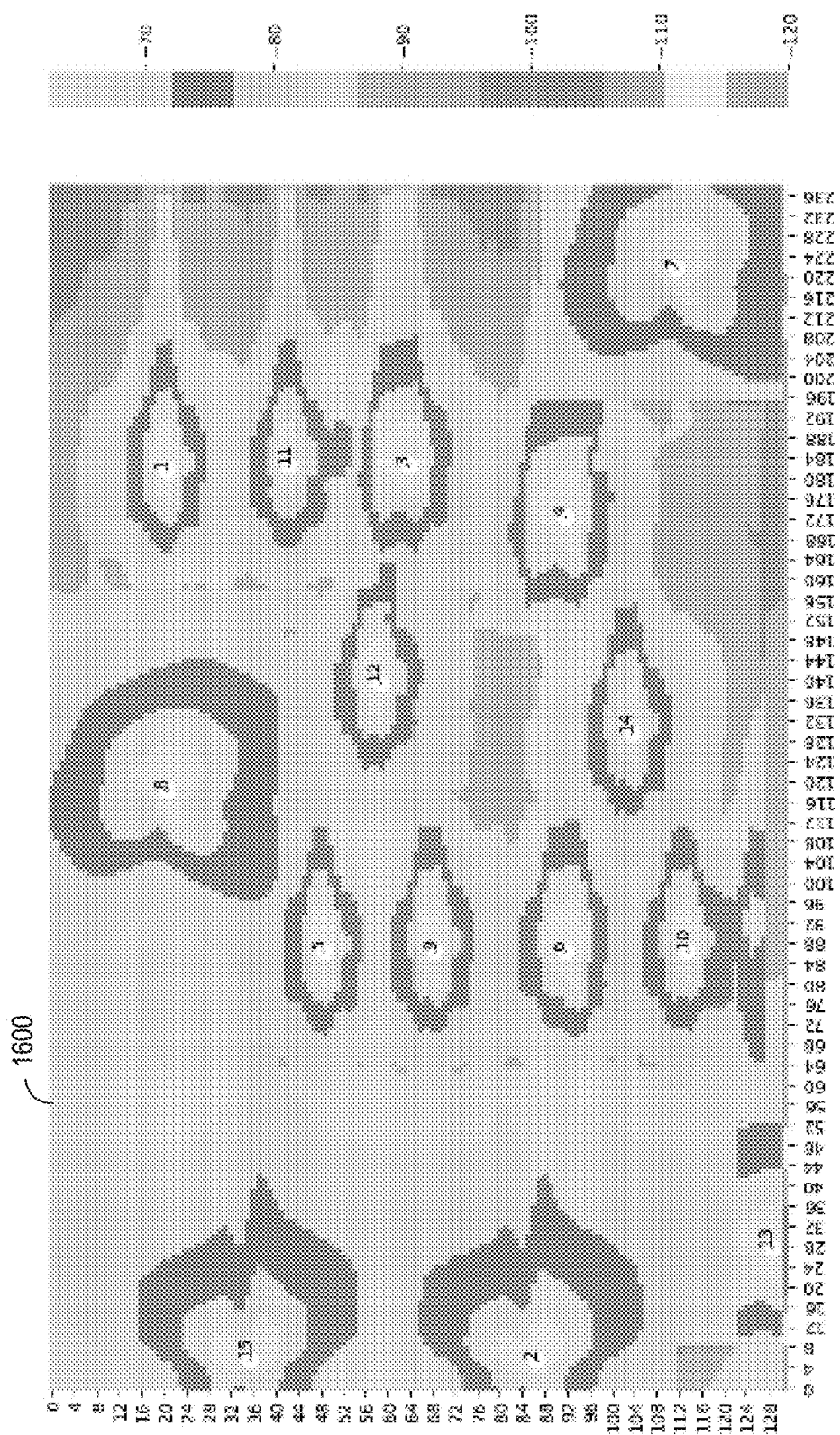
FIG. 16 shows an example of a RSRP coverage heatmap using a first power assignment.
Figure 17:
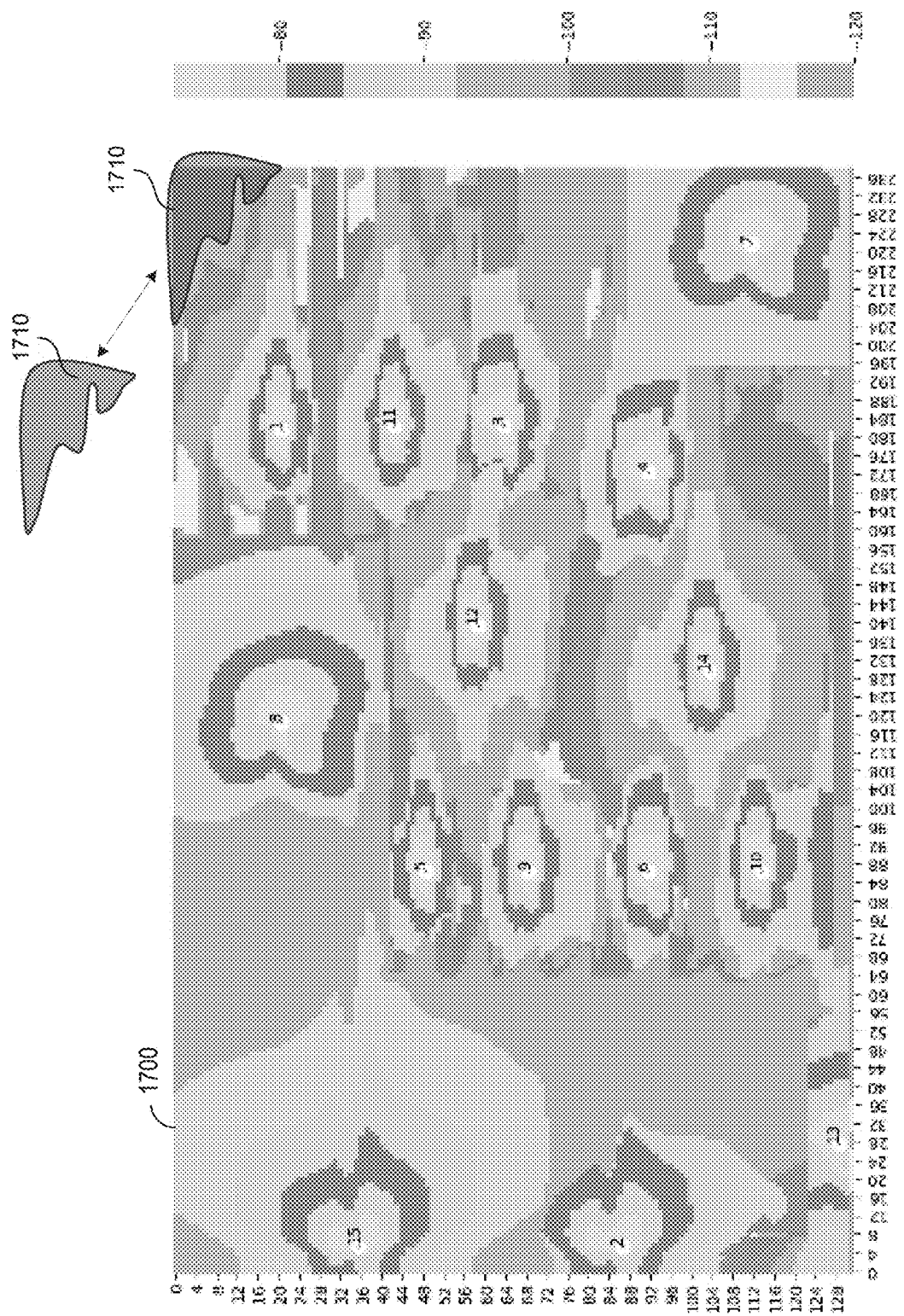
FIG. 17 shows the RSRP coverage heatmap using a second, reduced power assignment.

After the BS/AP has been selected (STEP 1420), initial steps (STEPS 1421) are performed for the selected BS/AP. An initial power assignment is chosen (STEP 1422); typically, the initial power assignment (n=1) will be the maximum transmit power allowed for a given channel. Based upon the initial power assignment, and the current power assignments for other BS/APs, an initial throughput Cumulative Distribution Function (CDF) chart (n=1) is created (STEP 1424), and a coverage map (n=1) is created (STEP 1426). FIG. 15, to be described, is an example of a throughput CDF chart, and FIGS. 16 and 17 show examples of coverage maps.

In the following steps a power assignment loop (STEPS 1427) will be performed, which will create a number of throughput CDF charts and coverage maps for each BS/AP. For reference purposes each separate CDF chart and each separate coverage map will be designated by "n"; i.e., "n" refers to the nth CDF chart and nth coverage map for the BS/AP, for example n=1 for the first CDF chart and the first coverage map; n=2 for the second CDF chart and second coverage map, and so forth.

Next, the power assignment of the selected BS/AP is reduced to a lower value (n+1), and using this reduced power, another throughput CDF chart (n+1) is created (STEP 1430), and another coverage map (n+1) is created (STEP 1432).

The two throughput CDF charts (n and n+1) are then compared (STEP 1434). The two coverage maps (n and n+1) are also compared (STEP 1436). These two comparisons are then utilized in a decision process (STEPS 1440, 1450, 1452, 1454, 1470) that makes a determination as to whether to repeat the Power Assignment Loop (STEPS 1427), or to end the Power Assignment Loop and make a power assignment (STEP 1470).

Generally, the loop repeats decision process, which will be described, makes a decision whether or not to repeat the loop based upon how beneficial it may be decrease power in the BS/AP. Particularly, if it appears that decreasing power may be beneficial, then repeating (performing another loop) may be beneficial and another iteration will be performed;

(STEP 1460), which includes incrementing the counter "n", and repeating the steps in the Power Assignment Loop 1427. For example, if the most recent power decrease improves throughput, and does not create any coverage problems, then it may be beneficial to repeat the loop.

However, if it appears that performing another loop will not be beneficial, then a final power assignment is made for the selected BS/AP (STEP 1470). For example, if the most recent power decrease reduces throughput, and/or creates coverage problems, then it is unlikely that another loop would be useful, and a final power assignment will be made. The final power assignment process may include determining whether to revert to a previous assigned power (1474), or to keep the currently assigned power (STEP 1476).

After the final power assignment 1470, if there are more BS/APs to be assigned power (STEP 1480), then the next BS/AP is selected (STEP 1420). The next BS/AP selected (STEP 1420) is typically the BS/AP next most likely to cause interference; e.g., the BS/AP with the next largest sum of edge weights after the previously-assigned BS/AP. The initial steps are taken for the selected BS/AP (STEPS 1421), and the Power Assignment Loop (STEPS 1427) is performed. The process is repeated until all BS/APs have been received a final power assignment (STEP 1480).

(13) Loop Repeat Decision

As discussed briefly above, a loop repeat decision is made, responsive to the throughput CDF chart comparisons and the coverage map comparisons, to determine if decreasing the power assignment might be beneficial. If decreasing the power assignment may be beneficial then the loop will be repeated, if not then the power assignment loop will be exited, a final assignment made, and the next BS/AP selected.

To provide useful information for the loop repeat decision, a number of operations may be performed, which will be described in more detail below. These operations can be summarized as follows:

Ensure that the throughput CDF does not worsen (STEP 1440);
Ensure no coverage holes are created (based on minimum RSRP thresholds) (STEP 1450);
Ensure there is significant overlap between BS/APs for handover (HO regions defined by thresholds) (STEP 1452); and
Ensure that no handover targets are lost as a result of the power decrease (STEP 1454);

(14) Ensure Throughput CDF Improves (STEP 1440)

Responsive to the throughput CDF chart comparison (STEP 1434), the effect of decreasing power on the throughput can be observed and analyzed (STEP 1440). For example, it can be checked if the throughput improves, stays the same, or gets worse (STEP 1440). For example, the reduced power assignment may or may not increase the throughput CDF as measured by some heuristic measurement (for example, one such metric is the improvement of the tail end of the CDF which has the goal of ensuring that no spots in the deployment have exceptionally poor throughput). However, the metric can be revised/chosen depending upon the goals of the deployment; for example, the metric can be chosen to balance coverage and throughput goals.

FIG. 15 is a chart 1500 that shows an example of a comparison of two DL throughput CDFs, with the original CDF 1510 shown in red and the post-reduction CDF 1520 shown in green. If a determination is made that throughput is improved, then the power assignment loop may be repeated, if no improvement, then a final power assignment may be made.

(15) Coverage Map Analysis

Responsive to the coverage chart comparison (STEP 1432), the effect of decreasing power on the coverage areas can be observed and analyzed (STEPS 1450, 1452, 1454). Generally, if the effect of reducing power is positive or neutral, the power assignment loop will be repeated (STEP 1460), but if the effect of reducing power is adverse, then the power may be reverted to the previous value and a final assignment made (STEP 1470).

(16) Coverage Hole Avoidance (STEP 1450)

The effect of decreasing power on the coverage areas is observed and a decision is made (STEP 1450). If no significant coverage holes are introduced in the deployment which may be found by ensuring that no more than a small epsilon number of points on the overall grid falls beneath an RSRP threshold, then the loop may be repeated. However, if significant coverage holes are introduced, then a final power assignment may be made. (STEP 1470).

FIGS. 16 and 17 show two coverage maps: FIG. 16 shows an RSRP coverage heatmap 1600 using a current power assignment, and FIG. 17 shows a post-reduction coverage heatmap 1700, using the reduced power assignment.

One goal is to avoid coverage holes; FIG. 16 shows an example of an original RSRP heatmap 1600, and FIG. 17 shows a heatmap 1700 with an aggressive power decrease which introduces coverage holes such as the coverage hole indicated at 1710. Because this power reduction introduces coverage holes, in this scenario, the power decrease would be rejected, and the power assignment would be reverted to its previous value. However, in other scenarios if the power decrease doesn't induce a coverage hole, the reduction in power assignment may be maintained.

(17) Ensure Sufficient Coverage Overlap (STEP 1452)

By looking at a coverage map, the coverage overlap can be observed and analyzed. Particularly, overlap between adjacent coverages can be observed, and a determination made to ensure that sufficient overlap exists, and avoid creating areas where there is poor (or no) coverage.

In the Power Assignment Loop 1427, an initial (n) coverage is compared with a second (n+1) coverage that is provided by reducing the power (STEP 1436). Responsive to the coverage map comparison the changes in coverage overlap between an initial coverage and a modified coverage can be observed and analyzed. Comparing the two coverage maps, if an initial coverage overlap previously existed between BS/APs, one goal is to not reduce coverage overlap above a given threshold, and if that overlap is within threshold, then the loop may be repeated. However, if the threshold is exceeded, then the power assignment may be reverted and a final power assignment may be made.

Figure 18:
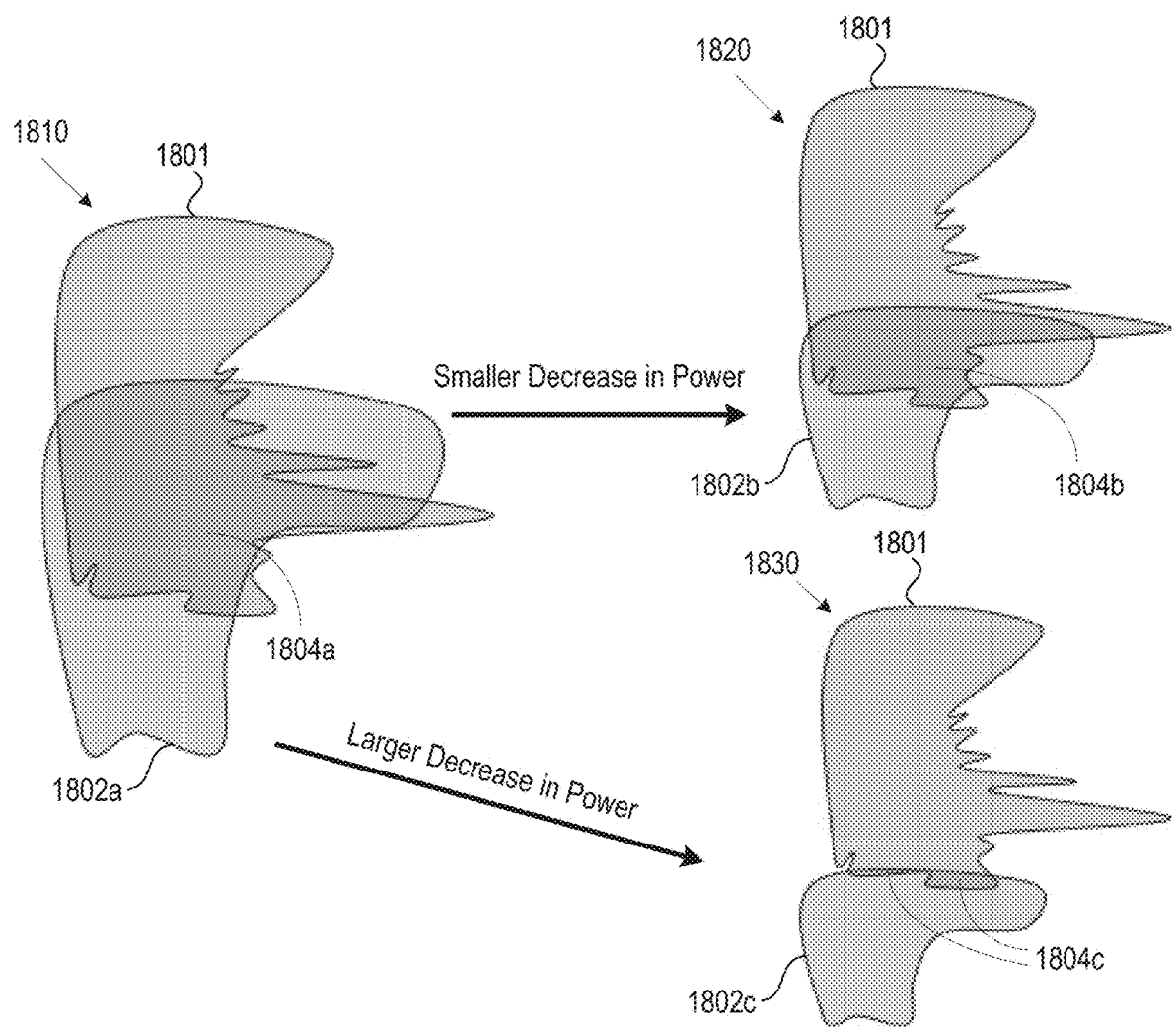
FIG. 18 is a graphical depiction of an example of coverage overlaps between two BS/APs, illustrating two potential outcomes of a reduction in power assignment.

FIG. 18 is a graphical depiction of an example of coverage overlaps between two BS/APs, illustrating two potential outcomes of a reduction in power assignment. The first (initial) coverage graph 1810 shows a first BS/AP coverage 1801 provided by a first BS/AP (not shown), a second BS/AP coverage 1802a provided by a second BS/AP (not shown). For illustration purposes, the first coverage area 1801 has a similar shape as the first contour coverage outline 812 (FIG. 8), and the second coverage area 1802a has a similar shape as the second contour coverage outline 822 (FIG. 8); in other examples the shapes may be very different.

The initial coverage graph 1810 shows an initial overlap 1804a between the first and second coverages 1801 and 1802a: we can see that 1) the coverage overlap 1804a exists and 2) it appears to be significant. Because the overlap is significant, there is potential for power decrease for the first or the second BS/AP. For illustration purposes, second and third graphs 1820, 1830 will show the result of two different power decreases for the second BS/AP; particularly the second graph 1820 shows the result of a first power decrease and the third graph 1830 shows the result of a second, larger power decrease. The first BS/AP remains at the same power in both the second and third graphs, and therefore the first coverage 1801 remains the same.

Particularly, the second graph 1820 shows the result of a first decrease in power assignment of the second BS/AP, which accordingly reduces second coverage 1802a to provide a first resulting coverage 1802b, and therefore reduces the first overlap 1804a to provide a smaller overlap 1804b. It can be seen that, although the first reduced coverage overlap 1804b is smaller than the original coverage overlap 1804a, the reduced coverage overlap 1804b still provides sufficient coverage overlap, and therefore this power reduction (the first decrease) may be accepted.

The third graph 1830 shows the result of a second decrease in the power assignment of the second BS/AP. The second power decrease is larger, and greatly reduces the coverage, providing second resulting coverage 1802c, and therefore significantly reduces the overlap to provide a much smaller overlap 1804c. In this case the smaller overlap 1084c will likely be determined to provide insufficient coverage overlap, and therefore the second, larger power reduction may be declined due to lack of coverage.

(18) Ensure Handover Targets Remain (STEP 1454)

In some cases, the BS/APs may still have sufficient coverage overlap, but handover targets may be compromised. In other words, even if the coverage hole requirement is met, the handover requirement can fail. Therefore, one goal is to maintain all handover targets within a given threshold; for example, if there is a point in the deployment that we anticipate handovers to occur in, we do not want to decrease powers of our BS/APs such that that point on the overall grid does not have a neighbor target for a handover to occur.

Figure 19:
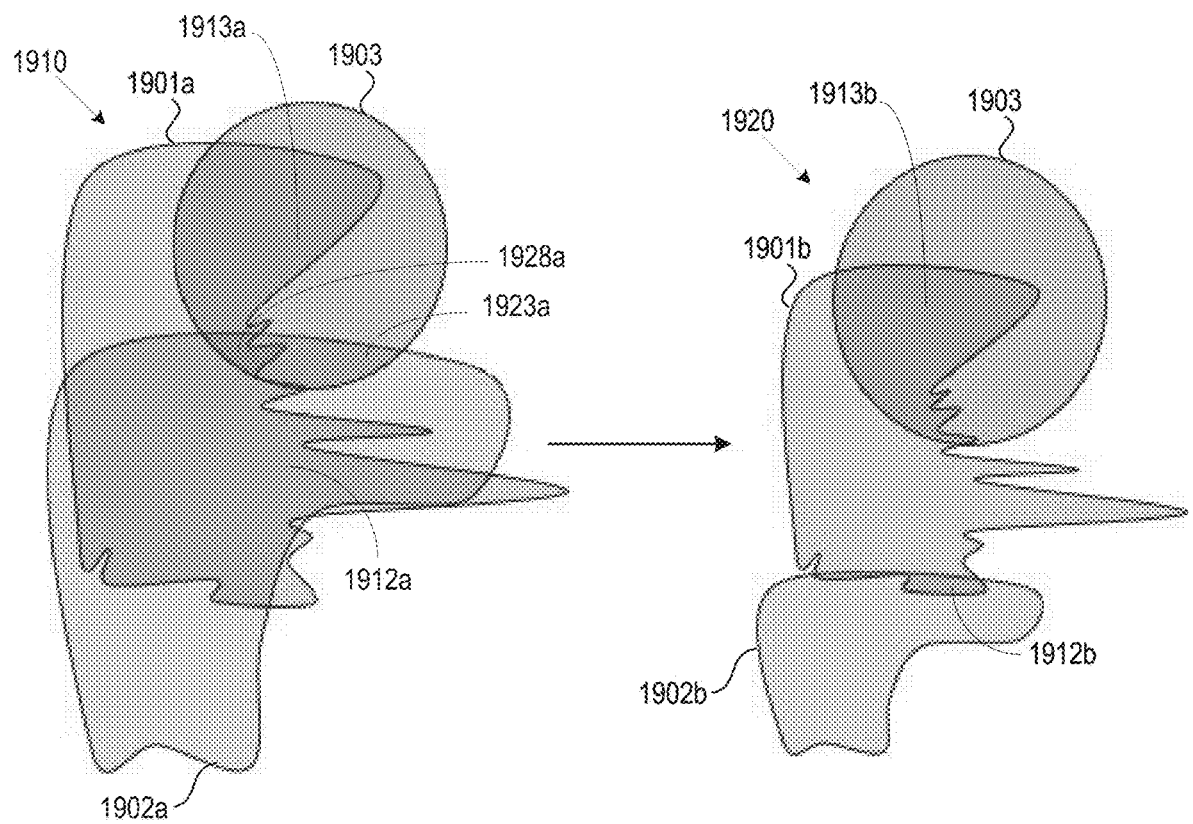
FIG. 19 is a graphical depiction of an example of coverage overlaps between three BS/APs.

FIG. 19 is a graphical depiction of an example of coverage overlaps between three BS/APs. (FIG. 18 shows coverages of two BS/APs). In FIG. 19 a first coverage graph 1910 shows a first coverage area 1901a provided by a first BS/AP (not shown) and a second coverage area 1902a provided by a second BS/AP (not shown). In addition, FIG. 19 shows a third coverage area 1903, approximately circular, that is provided by a third BS/AP (not shown). For illustration purposes, the first coverage area 1901a has a similar shape as the contour coverage outline 822 (FIG. 8), and the second coverage area 1902a has a similar shape as the contour coverage outline 812 (FIG. 8); in other examples the shapes may be very different.

The first coverage graph 1910 shows the initial overlaps between the first, second, and third coverage areas; particularly the initial overlaps include a first/second overlap 1912a between the first coverage area 1901a and the second coverage area 1902a, a first/third overlap 1913a between the first coverage area 1901a and the third coverage area 1903, a second/third overlap 1923a between the second coverage area 1902a and the third coverage area 1903. The third coverage area 1903 overlaps with this first-second overlap 1912a, at a common overlap area 1928a; i.e., all three coverage areas overlap there. Therefore, the third coverage area 1903 provides additional coverage for both the first and second BS/APs within the common overlap 1928a.

In the first coverage graph 1910, the overlaps 1912a, 1913a, 1923a, and 1928a provide sufficient coverage overlap, and handover targets are readily available; therefore, a power decrease can be considered and a power assignment loop 1427 (FIG. 14) can be performed.

To illustrate one example of power reduction, a second coverage graph 1920 shows the effect of power reductions in the first and second BS/APs, while holding the power in the third coverage area 1903 unchanged. The result is reduced coverage in the first and second coverage areas 1901b, 1902b, which reduces the overlaps accordingly. Particularly, the first and third coverage areas still intersect at a reduced overlap 1913b, and the first and second coverage areas overlap at a much-reduced overlap 1912b. However, the second coverage area 1904b no longer intersects with the third coverage area 1903, and there is no common overlap between all of the first, second, and third coverages.

In the second coverage graph 1920, it is important to note (in comparison with FIG. 18) that the reduced coverage areas may provide sufficient coverage overlap, and therefore the overlap conditions may not be violated. However, handover targets may be compromised. One goal is to maintain all handover targets that existed previously, within a given threshold, and if so, then the loop may be repeated. However, if the threshold is exceeded, then the power assignment may be reverted and a final power assignment may be made. Therefore, we see that although the coverage hole guarantee does not get rejected the second graph 1920, the handover guarantee fails.

Figure 20:
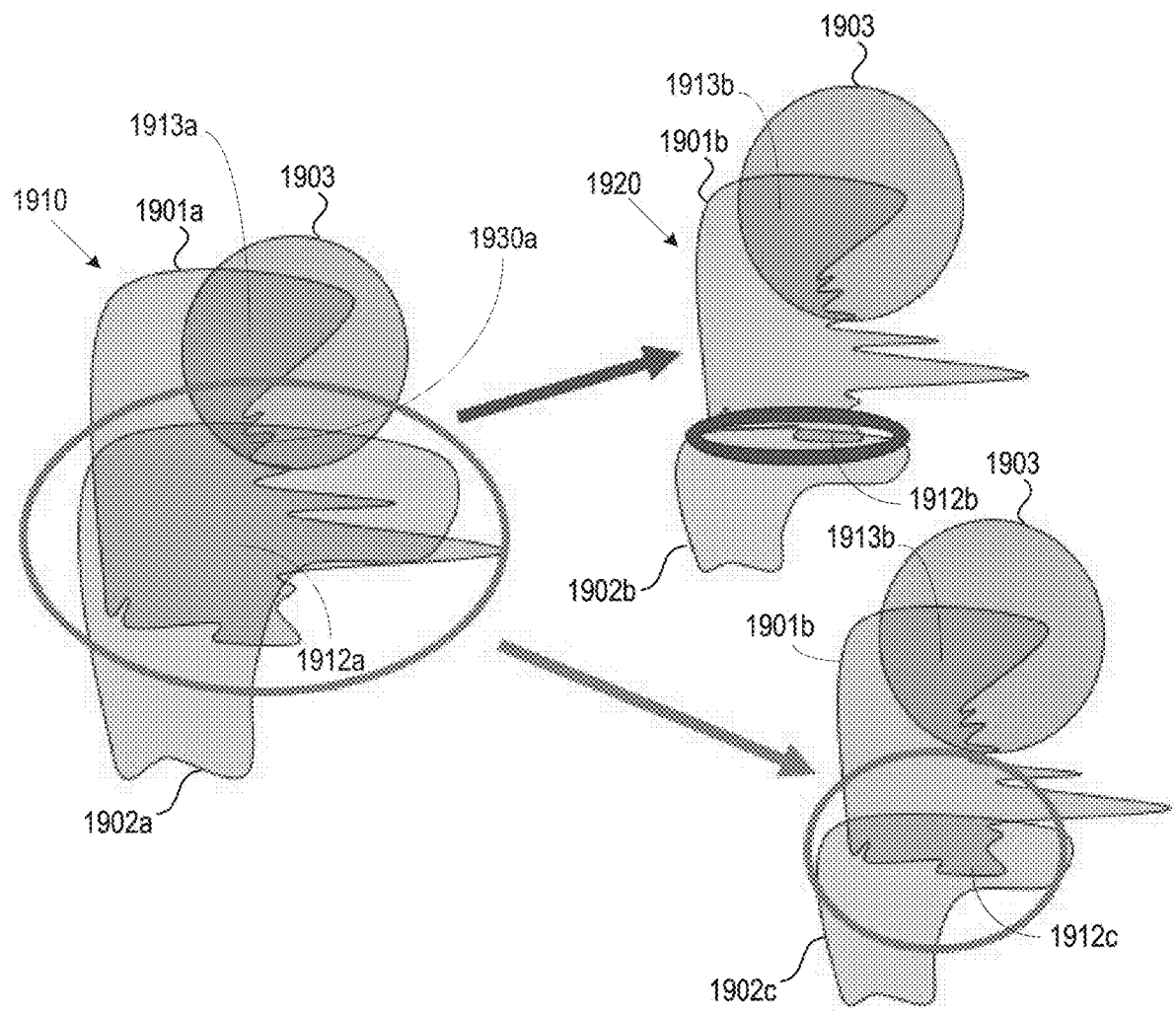
FIG. 20 is a graphical depiction that shows the first coverage graph and the second coverage graph and an example of a third power reduction from the first coverage graph.

Therefore, the power reduction in the second coverage graph 1920 may be reversed to some extent, as shown in a third coverage graph 1930, in FIG. 20.

FIG. 20 shows the first coverage graph 1910 and the second coverage graph 1920 (also shown in FIG. 19). In addition, FIG. 20 shows an example of a third power reduction from the first coverage graph 1910, in which the power in the second coverage area 1902c is reduced from the first graph 1910, but increased from the second graph 1920, and therefore the second coverage area 1902c is larger than the second coverage area 1902b in the second graph 1920. Therefore, there is an increased first/second overlap 1912c in the third graph 1930.

Responsive to the coverage map comparison of the first, second and third graphs 1910, 1920, 1930, the presence of handover (HO) targets can be observed and analyzed. In the third coverage graph 1930 we do see that with a less aggressive power reduction, the handover targets that existed prior to the power decrease still exist, and therefore the power levels are acceptable.

Maintaining handover targets can be done, for example, by ensuring that all BS/APs that have had at least one inter-frequency neighbor that can serve a given point on the overall grid does not decrease past the point where none (i.e., zero) inter-frequency neighbors can serve that point. In other words: if there is a point in the deployment that we anticipate handovers to occur in, we do not want to decrease powers of our BS/APs such that that point on the overall grid does not have a neighbor target for a handover to occur.

(19) Results and Use of Results

Figure 21:
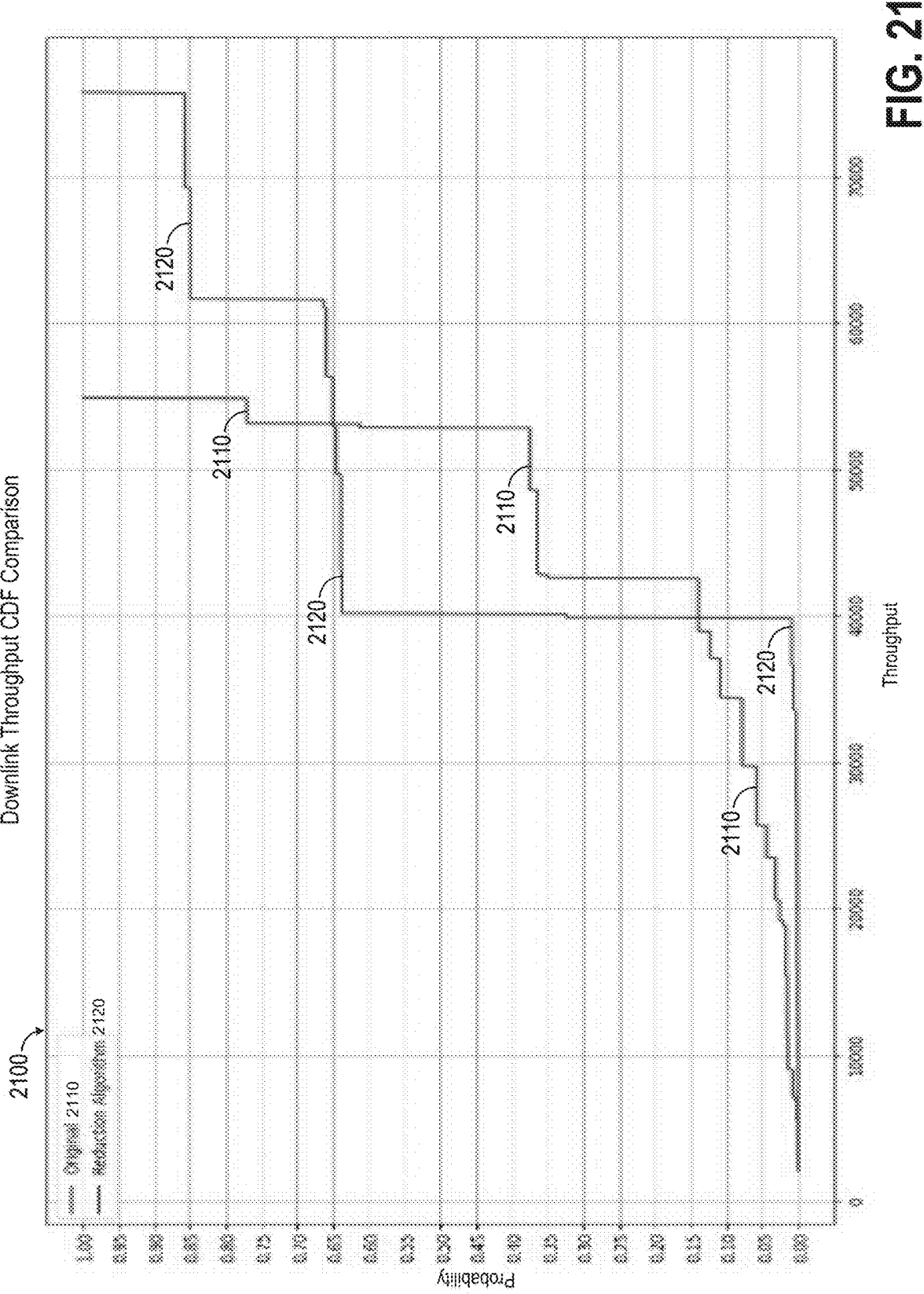
FIG. 21 is an example of a throughput CDF chart that shows a comparison of two DL throughput CDFs.

FIGS. 21 through 24 show one example of use of network graphs to deploy 4 BS/APs and corresponding results. Particularly, FIG. 21 is an example of a throughput CDF chart 2100 that shows a comparison of two DL throughput CDFs, with the original CDF 2110 shown in red and the post-reduction CDF 2120 shown in green. Generally, the overarching end goal of incrementally decreasing the transmit power manifests itself in the form of better throughput (which also implies better SINR). In this example we can deduce that the reduction algorithm improves, because the tail end throughput (i.e., the 15th percentile) improves significantly. In other words, we see that the worst possible throughput for a customer should be better as a result of the power reduction algorithm, and therefore in this example the reduction in power may be useful.

Figure 22:
FIG. 22 is an example of a coverage heatmap with four BS/APs positioned in the RAN deployment at an initial power assignment.
Figure 23:
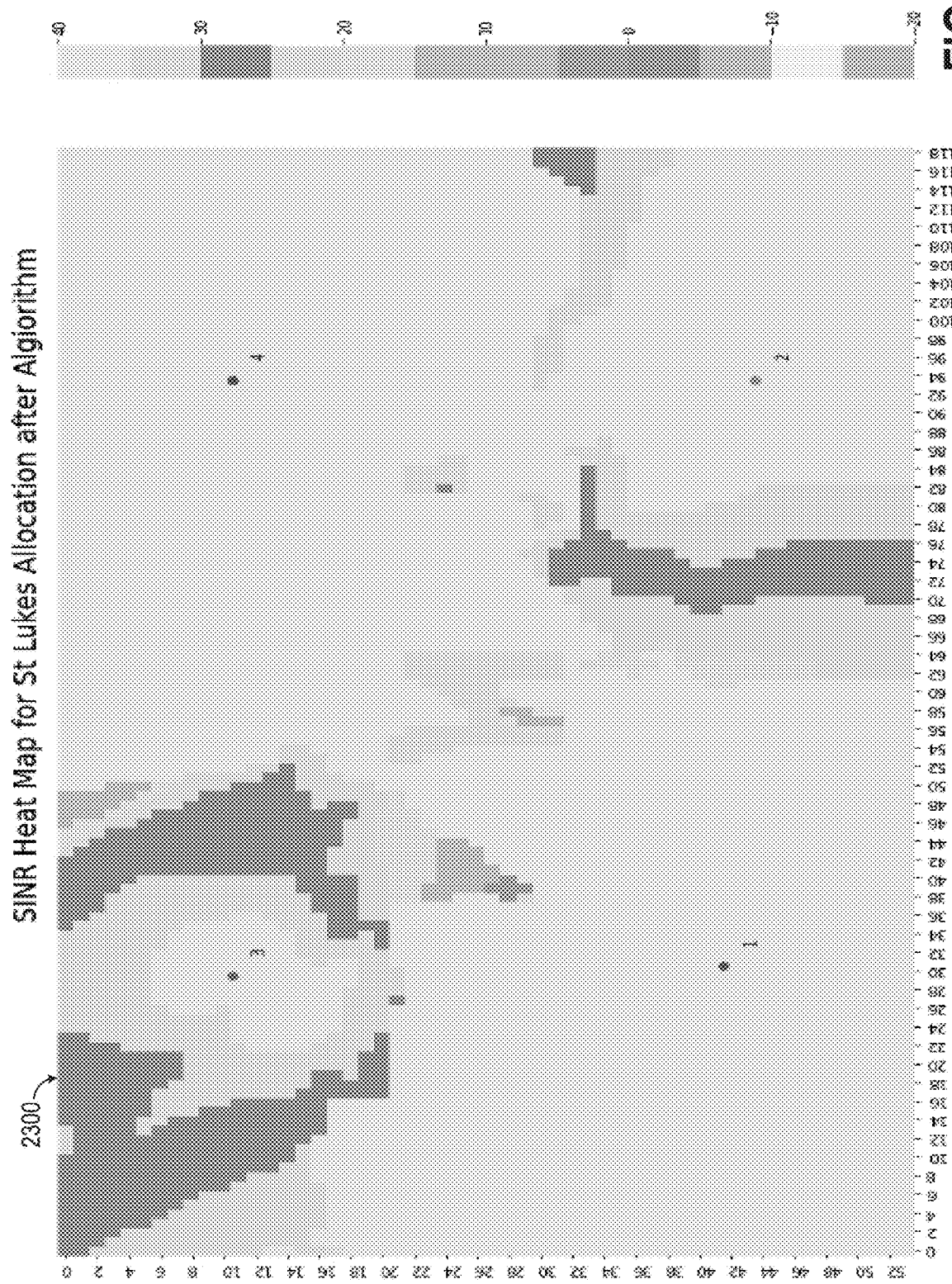
FIG. 23 is an example of the coverage heatmap resulting after the operations described herein have reassigned the initial power assignments from FIG. 22.
Figure 24:
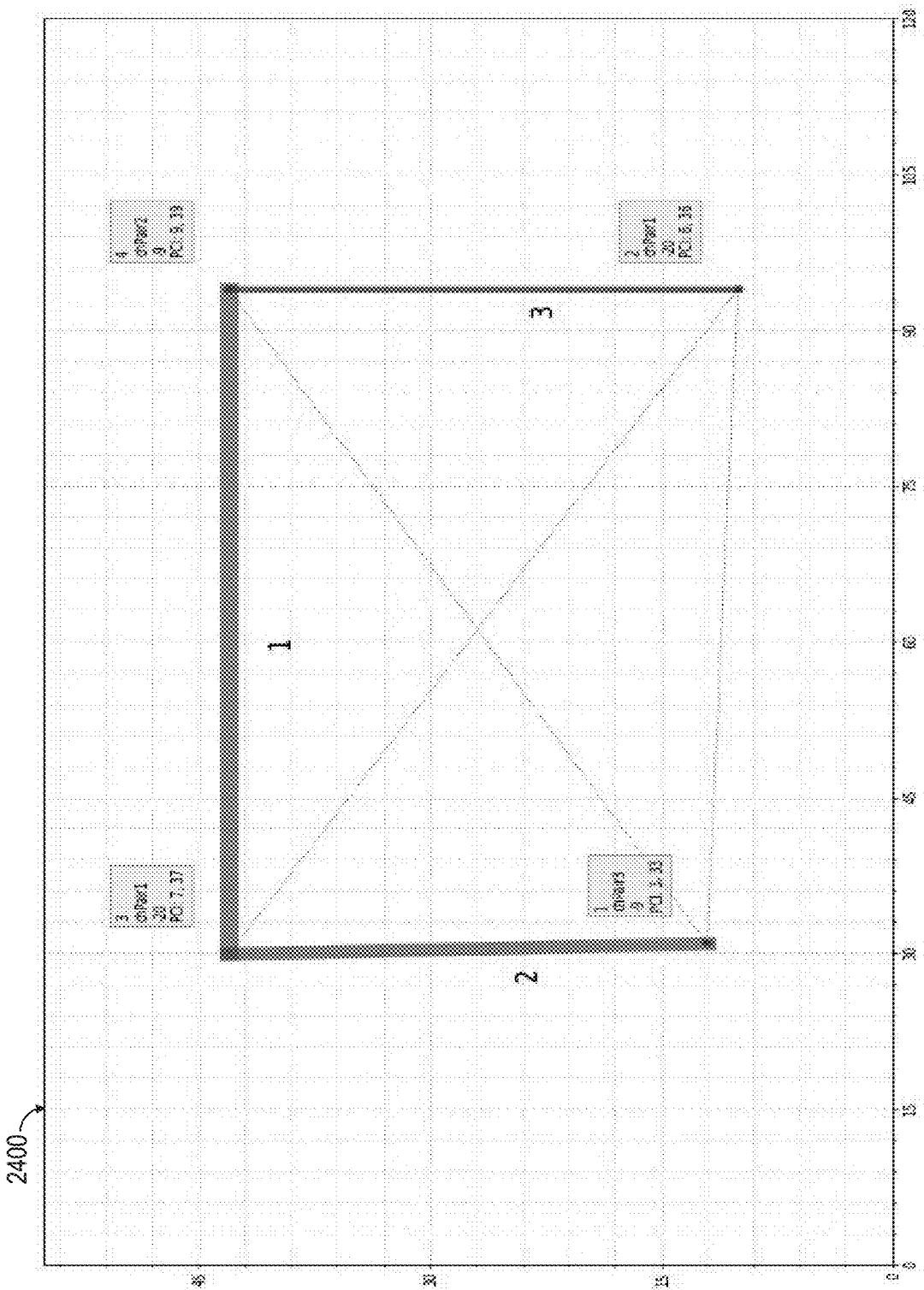
FIG. 24 shows the completed network graph following from the allocation shown in FIG. 23 showing the RAN parameters for each of the four BS/APs.

FIG. 22 is an example of a coverage heatmap 2200 with four BS/APs positioned in the RAN deployment (referenced in FIG. 22 as "St. Luke's"), at an initial power assignment prior to performing the power assignment operations described herein. FIG. 23 is an example of the coverage heatmap 2300 resulting after the operations described herein have reassigned the initial power assignments from FIG. 22. These power reassignments among the BS/APs in FIG. 23 provide better throughput and coverage vs the heatmap of FIG. 22. FIG. 24 shows the completed network graph 2400 following the allocation shown in FIG. 23, showing the RAN parameters (channel, power, PCI) for each of the four BS/APs as follows:

1: chPair3, −9, PCI: 3.33
2: chPair1, −20, PCI: 6.36
3: chPair1, −20, PCI: 7.37
4: chPair2, −9, PCI: 9.39

Figure 25:
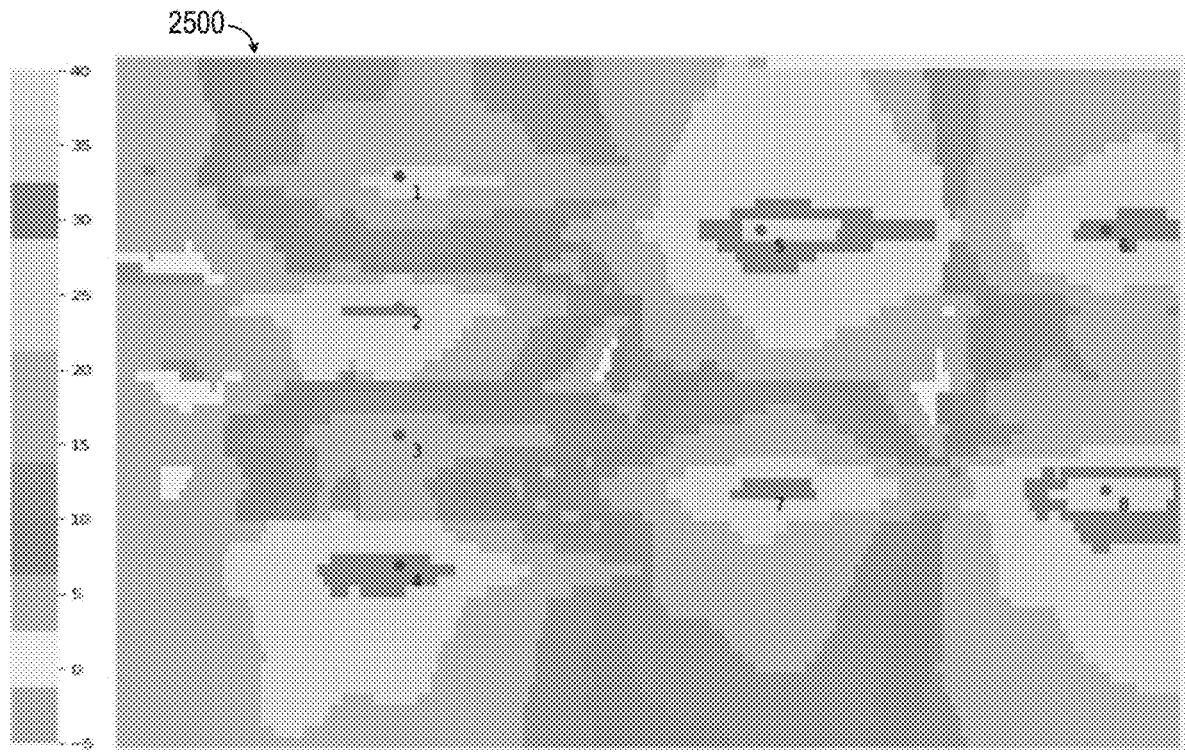
FIG. 25 is an example of an SINR coverage heatmap at a first power assignment.
Figure 26:
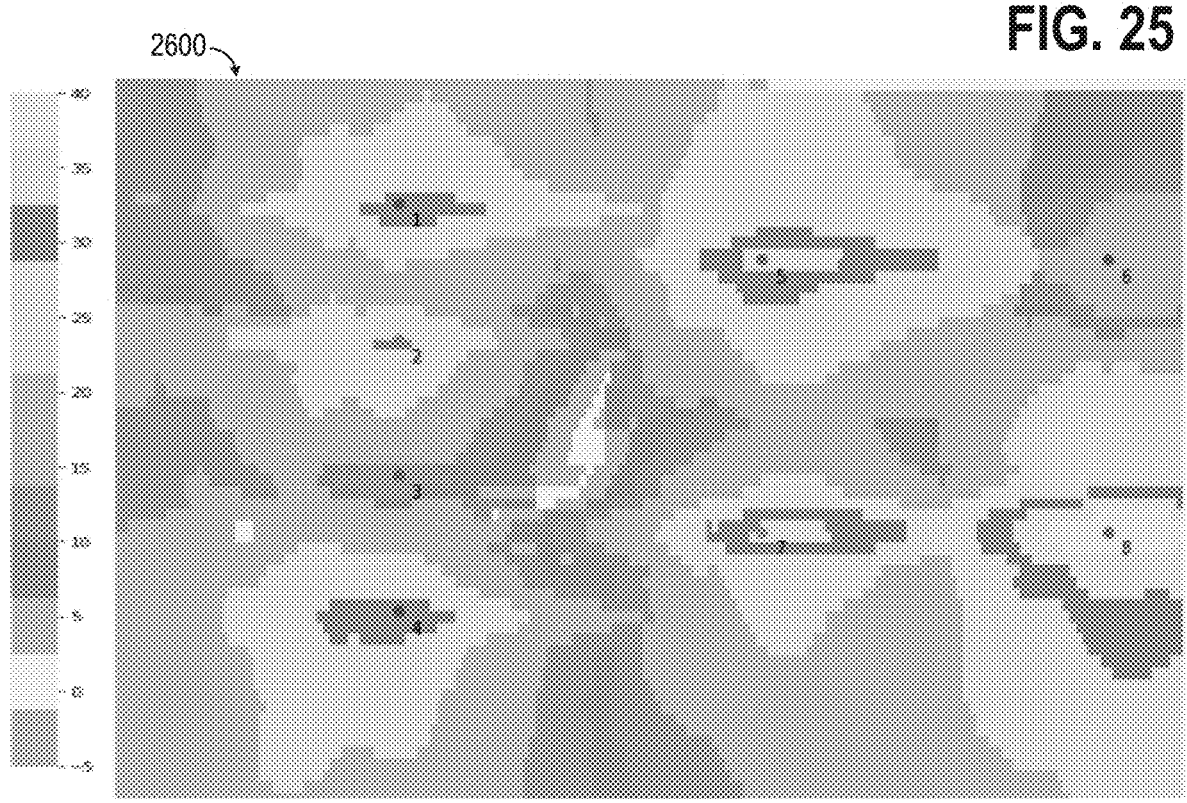
FIG. 26 is an example of the SINR coverage heatmap of FIG. 25 at a second, different power assignment.

FIGS. 25-28 show a second example of use of network graphs and results. In this example, there are eight BS/APs positioned in an enterprise location RAN deployment. FIG. 25 shows an example of a SINR coverage heatmap 2500 at a first power assignment. FIG. 26 shows an SINR coverage heatmap 2600 at a second, different power assignment. We notice that between the SINR Heatmap 2500 in FIG. 25 (prior to the power decrease algorithm), and the SINR Heatmap 2600 in FIG. 26 (post the power decrease algorithm) that there is significant disparity between the SINR values and that some places actually show up to be worse SINR values than they started. However, many locations show improvement. Overall, the change tells us that the tradeoffs made in FIG. 26 provide a better RAN than that shown in FIG. 26.

Figure 27:
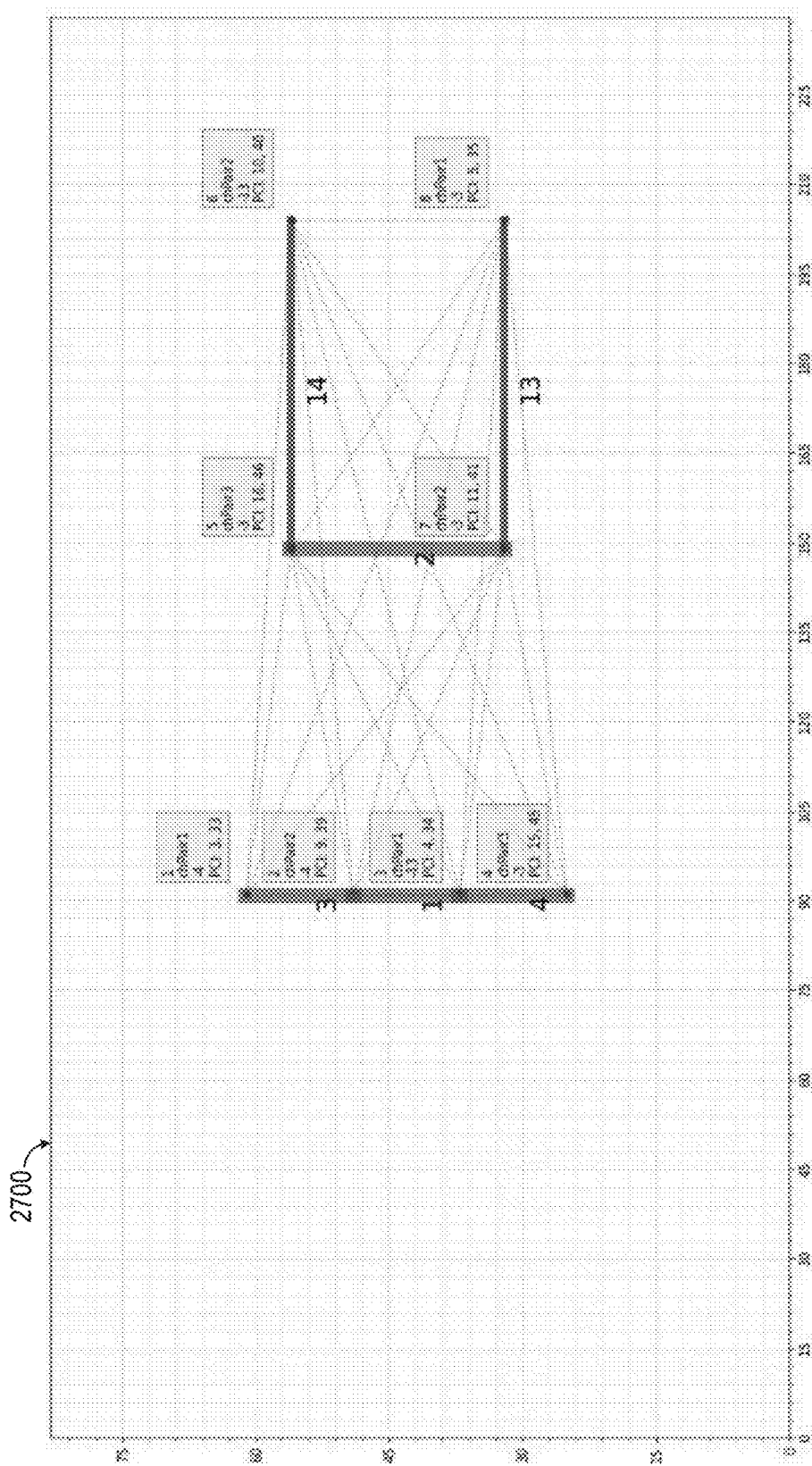
FIG. 27 is an example of a completed network graph resulting from utilizing the RAN parameters that generated the coverage heatmap shown in FIG. 26.

FIG. 27 is an example of a completed network graph 2700 resulting from utilizing the RAN parameters that generated the coverage heatmap 2600 shown in FIG. 26. In FIG. 27, the RAN parameters (channel, power, PCI) for the eight BS/APs are as follows:

1: chPair1, −4, PCI: 3.33
2: chPair2, −4, PCI: 9.39
3: chPair1, −13, PCI: 4.34
4: chPair3, −3, PCI: 15.45
5: chPair3, −3, PCI: 16.46
6: chPair2, −13, PCI: 10.40
7: chPair2, −3, PCI: 11.41
8: chPair1, −3, PCI: 5.35.

FIG. 28 is a table 2800 that shows an example of a chart of the RAN parameters shown in FIG. 27, showing assigned channels, PCIs, and power assignments for the eight BS/APs.

FIG. 30 is table 3000 of RAN parameters in another example resulting from using the method disclosed herein. In this example some of the BS/APs are located within a building, and some outside; particularly, twelve of the BS/APs are located within a building, and four outside. FIG. 30 illustrates that the method and apparatus described herein can be utilized to assign RAN parameters to BS/APs wherever located on the campus location, such as inside a building, or outdoors.

(20) EN Implementation Diagram

FIG. 29 is a block diagram of an implementation of an Enterprise Network (EN) 2900 that includes units for allocating and reallocating RAN parameters.

The EN 2900 includes one or more Radio Access Networks (RANs) 2910 each located on a separate campus location 300. Each RAN 2910 comprises a plurality of BS/APs 310 that are wirelessly connected to a plurality of UEs 2912. The RANs 2910 are connected to an Operator Core Network 2920 by any suitable connection. For example, all the BS/APs 310 in the RAN 2910 may be connected by any appropriate communications means, such as wire, fiber optic, and wireless radio, which is then connected to the Core Network 2920. The BS/APs in the RANs 2910 are connected to, and operated and controlled by, the Core Network 2920. Some of the RAN services may be provided by the Core Network 2920. The RANs 2910 provide wireless connection and services to a plurality of UEs on the campus locations 300. A user interface (not shown) may be provided and connected to the Core Network 2910 for administration of the EN 2900.

In an enterprise network deployment, the BS/APs 310 and elements of the RAN 2910 will be located on the campus location 300, and it is very likely that the Core Network 2920 will be physically located at or near the enterprise location, especially in large or multiple deployments in the same area. However, for smaller deployments, or for multiple small deployments, it may be more cost effective to physically locate the Core Network remotely from the enterprise location.

In some embodiments the Core Network 2920 is connected to a Network Orchestration module 2930 that may include an Administrative Service Unit 2932 for remote administration of the enterprise network, databases 2934, other components as may be necessary or useful, and other functional units such as machine learning and artificial intelligence units. The Orchestration Module 2930 is connected to the Core Network 2920 by any appropriate communications means, such as a PDN 2940. Generally, the Network Orchestration Module 2930 supports the Core Network 2920 and can provide additional services.

The Core Network 2920 (which may also be called a Programmable Service Edge or "PSE") provides a variety of services for the EN 2900 using a plurality of components connected to each other by any appropriate means. In the illustrated embodiment of FIG. 29, the Core Network 2920 includes an Automatic Configuration Server (ACS) 2921, a domain proxy 2922, a Path Loss Estimation Unit 2923, a Network Graph Construction Unit 2924, and a SON (Self Organizing Network) service unit 2925 that includes a Channel assignment Unit 2926, a PCI Allocation Unit 2927, and a Power Assignment Unit 2928. The SON unit 2925 also includes a Reallocation unit that reallocates RAN parameters using the network graphs if radio conditions change; e.g., if the SAS issues a channel termination order. In some embodiments, these units may be located offsite, for example the Path Loss Estimation Unit 2923 may be at another location and path loss estimation may be performed by another entity.

In addition, the Core Network 2920 may include components such as an MMF (Mobility Management Function) unit, a monitoring service unit, an SGW/PGW (Serving Gateway/Packet Data Network Gateway) unit, a TR069 unit, a KPI (Key Performance Indicator) service unit, databases such as a Location Database, and other units such as an Operations, Administration, and Maintenance (OAM) Server, and units for other services.

Figure 2:
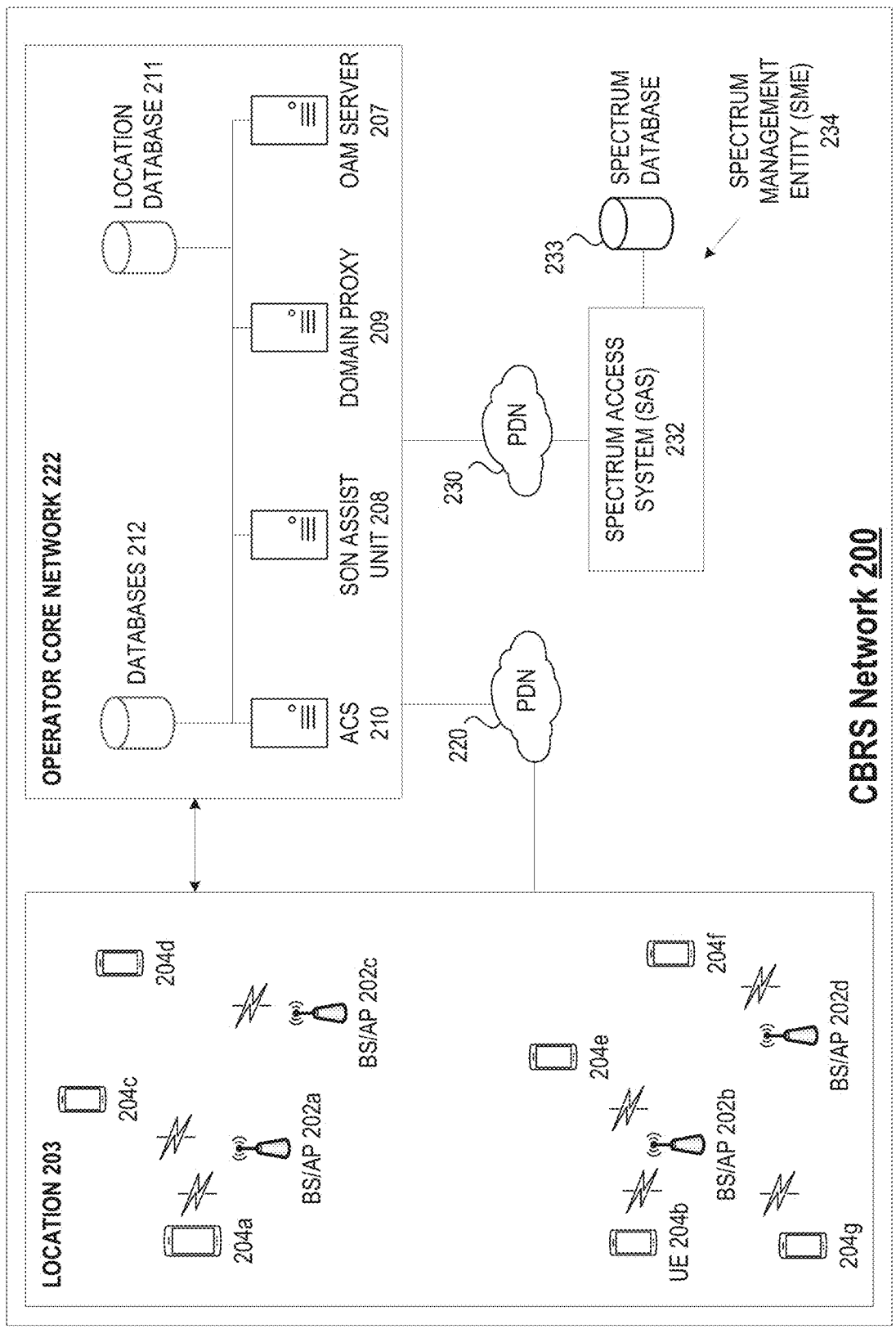
FIG. 2 is a block diagram of a wireless communication network in which a CBRS system is implemented, including BS/APs deployed at an enterprise location, UEs wirelessly connected to them, and an operator network connected to a Spectrum Management Entity (SME).

The Core Network 2920 may be connected to a Spectrum Management Entity (SME) 2950, for example it may be connected to the SME 234 shown in FIG. 2.

Programmable Embodiments

Some or all aspects of the invention, for example aspects of the algorithmic characteristics of the invention, may be implemented in hardware or software, or a combination of both (e.g., programmable logic arrays). Unless otherwise specified, the algorithms included as part of the invention are not inherently related to any particular computer or other apparatus. In particular, various general purpose computing machines may be used with programs written in accordance with the teachings herein, or it may be more convenient to use a special purpose computer or special-purpose hardware (such as integrated circuits) to perform particular functions. Thus, embodiments of the invention may be implemented in one or more computer programs (i.e., a set of instructions or codes) executing on one or more programmed or programmable computer systems (which may be of various architectures, such as distributed, client/server, or grid) each comprising at least one processor, at least one data storage system (which may include volatile and non-volatile memory and/or storage elements), at least one input device or port, and at least one output device or port. Program instructions or code may be applied to input data to perform the functions described in this disclosure and generate output information. The output information may be applied to one or more output devices in known fashion.

Each such computer program may be implemented in any desired computer language (including machine, assembly, or high-level procedural, logical, or object-oriented programming languages) to communicate with a computer system, and may be implemented in a distributed manner in which different parts of the computation specified by the software are performed by different computers or processors. In any case, the computer language may be a compiled or interpreted language. Computer programs implementing some or all of the invention may form one or more modules of a larger program or system of programs. Some or all of the elements of the computer program can be implemented as data structures stored in a computer readable medium or other organized data conforming to a data model stored in a data repository.

Each such computer program may be stored on or downloaded to (for example, by being encoded in a propagated signal and delivered over a communication medium such as a network) a tangible, non-transitory storage media or device (e.g., solid state memory media or devices, or magnetic or optical media) for a period of time (e.g., the time between refresh periods of a dynamic memory device, such as a dynamic RAM, or semi-permanently or permanently), the storage media or device being readable by a general or special purpose programmable computer or processor for configuring and operating the computer or processor when the storage media or device is read by the computer or processor to perform the procedures described above. The inventive system may also be considered to be implemented as a non-transitory computer-readable storage medium, configured with a computer program, where the storage medium so configured causes a computer or processor to operate in a specific or predefined manner to perform the functions described in this disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" or "unit" does not imply that the components or functionality described or claimed as part of the module or unit are all configured in a common package. Indeed, any or all of the various components of a module or unit, whether control logic or other components, can be combined in a single package or separately maintained and can further be distributed in multiple groupings or packages or across multiple locations.

Additionally, the various embodiments set forth herein are described with the aid of block diagrams, flowcharts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A resource allocation system for allocating wireless resources to each of the Base Station/Access Points (BS/APs) of a Radio Access Network (RAN) situated in a campus location of a wireless Enterprise Network (EN), comprising:
   a path loss estimation unit for providing path loss data associated with the BS/APs in the campus location;
   a network graph construction unit for constructing a network graph of the RAN responsive to the path loss data;
   a domain proxy for determining available channels and a maximum power available for each of the available channels;
   a Self Organizing Network (SON) unit including
      a channel assignment unit for assigning the channels to the BS/APs responsive to the network graph;
      a Physical Cell Identifier (PCI) allocation unit for determining PCI allocation for each assigned channel responsive to the network graph; and
      a power assignment unit for assigning power to each of the BS/APs responsive to the network graph in an iterative process that incrementally reduces the power and observes the effect on the resulting throughput Cumulative Distribution Function (CDF);
   wherein the RAN resource allocation system further comprises an Automatic Configuration Server (ACS) for implementing the channel assignments, PCI allocations, and power assignments.

2. The apparatus of claim 1 wherein the EN comprises a Citizen's Broadband Radio Service (CBRS) system.

3. The apparatus of claim 2 wherein the EN comprises a domain proxy configured to communicate with a Spectrum Allocation System (SAS) to receive the information regarding the available channels and maximum power available for each of the channels.

4. The apparatus of claim 3 wherein the SON comprises a Reallocation Unit that reallocates the RAN parameters responsive to a change in available channels.

5. A method of allocating Radio Access Network (RAN) resources in a wireless Enterprise Network (EN) that operates in a spectrum-controlled band divided into a plurality of channels, the EN including a plurality of Base Station/Access Points (BS/APs) for communicating with a plurality of User Entities (UEs), comprising:
   a) receiving path loss data for each of the BS/APs in the RAN;
   b) constructing a network graph responsive to the path loss data;
   c) determining available channels and a maximum power available for each of the available channels;
   d) assigning the channels to the BS/APs responsive to the network graph;
   e) determining PCI allocation for each assigned channel responsive to the network graph; and
   f) assigning power to each of the BS/APs responsive to the network graph, in an iterative process that incrementally reduces the power and observes the effect on the resulting throughput Cumulative Distribution Function (CDF);
   receiving a communication from the Spectrum Allocation System (SAS) that one or more of the assigned channels must be terminated; and
   reallocating the RAN resources responsive to the network graph to exclude the terminated channel;
   receiving a communication from the SAS that one or more of the assigned channels must be terminated; and
   reallocating the RAN resources responsive to the network graph to exclude the terminated channel;
   wherein reallocating the RAN resources includes performing steps c), d), e) and f); and
   wherein reallocating the RAN resources is performed responsive substantially solely to the network graph from step b) and the available resources available from step c), so that the RAN resources are reallocated quickly.

6. The RAN resource allocation method of claim 5 wherein the EN operates in the Citizen's Broadband Radio Service (CBRS) band, and the step of determining available channels and maximum power available includes communicating with an SAS that controls the CBRS spectrum.

7. A method of planning a Radio Access Network (RAN) for an enterprise network that includes a plurality of Base Station/Access Points (BS/APs), and deploying the plurality of BS/APs in the RAN with limited radio resources, comprising:
   determining path losses between the BS/APs in the enterprise network;
   determining RAN parameters for each BS/AP responsive to the path loss between the BS/APs in the RAN, including assigning channels, allocating Physical Cell Identifiers (PCIs), and determining power assignments;
   operating the RAN utilizing the determined RAN parameters;
wherein determining the power assignments to the BS/APs comprises:
   reducing the power to at least one BS/AP;
   determining whether or not to accept the power reduction responsive to throughput Cumulative Distribution Function (CDF) comparisons before and after the power reduction; and
   iteratively repeating the reducing and determining steps.

8. The method of claim 7 further comprising:
   constructing a network graph responsive to the path loss data;
   assigning the channels to the BS/APs responsive to the network graph; and
   determining PCI allocation for each assigned channel responsive to the network graph.

9. The method of claim 8 wherein the enterprise Radio Access Network (RAN) operates in a spectrum divided into a plurality of channels, one or more of which may be lost, further comprising:
   in the event of a loss of one or more channels, re-assigning the channels, determining PCI allocation, and determining power assignments responsive to the network graph.

10. The method of claim 9 wherein the Enterprise Network (EN) operates in a spectrum-controlled band, and further comprising determining available channels and maximum power available.

11. The method of claim 9 wherein the Enterprise Network (EN) operates in the CBRS band, and the step of determining available channels and maximum power available includes communicating with an SAS that controls the Citizen's Broadband Radio Service (CBRS) spectrum.

12. The method of claim 7 wherein the power reduction is accepted if throughput CDF is improved, and there is a sufficient coverage overlap for handovers between BS/APs.

13. A method of reallocating Radio Access Network (RAN) resources using a network graph showing path loss in a wireless Enterprise Network (EN) operating in a spectrum-controlled band that is divided into a plurality of channels, the EN including a plurality of Base Station/

Access Points (BS/APs) for communicating with a plurality of User Entities (UEs), comprising:
  determining available channels and a maximum power available for each of the available channels; and
  reallocating the RAN resources responsive to the network graph, including assigning the channels to the BS/APs responsive to the network graph;
    determining PCI allocation for each assigned channel responsive to the network graph; and
    assigning power to each of the BS/APs responsive to the network graph, in an iterative process that incrementally reduces the power and observes the effect on the resulting throughput Cumulative Distribution Function (CDF);
wherein the EN operates in the Citizen's Broadband Radio Service (CBRS) band, further comprising:
  receiving a communication from a Spectrum Allocation System (SAS) that one or more of the assigned channels must be terminated;
  determining available channels and maximum power available; and
    reallocating the RAN resources responsive to the network graph to exclude the terminated channel.

14. The method of claim 13 wherein reallocating the RAN resources is performed responsive substantially solely to the network graph and the available resources available, so that the RAN resources are reallocated quickly.

* * * * *